(12) United States Patent
Yong

(10) Patent No.: US 9,997,823 B2
(45) Date of Patent: Jun. 12, 2018

(54) COMBINATION ANTENNA

(71) Applicants: Sony Corporation, Tokyo (JP); Sony Mobile Communications Inc., Tokyo (JP)

(72) Inventor: Check Chin Yong, Tokyo (JP)

(73) Assignees: Sony Corporation, Tokyo (JP); Sony Mobile Communications Inc., Tokyo (JP)

(*) Notice: Subject to any disclaimer, the term of this patent is extended or adjusted under 35 U.S.C. 154(b) by 0 days. days.

(21) Appl. No.: 15/483,244

(22) Filed: Apr. 10, 2017

(65) Prior Publication Data

US 2017/0214125 A1    Jul. 27, 2017

Related U.S. Application Data

(63) Continuation of application No. 14/738,689, filed on Jun. 12, 2015, now Pat. No. 9,660,327.

(51) Int. Cl.
| | | |
|---|---|---|
| *H01Q 1/24* | (2006.01) | |
| *H01Q 1/48* | (2006.01) | |
| *H01Q 1/50* | (2006.01) | |
| *H02J 7/02* | (2016.01) | |
| *H02J 50/20* | (2016.01) | |
| *H01Q 5/35* | (2015.01) | |

(52) U.S. Cl.
CPC ............ *H01Q 1/243* (2013.01); *H01Q 1/48* (2013.01); *H01Q 1/50* (2013.01); *H02J 7/025* (2013.01); *H02J 50/20* (2016.02); *H01Q 5/35* (2015.01)

(58) Field of Classification Search
CPC ............ H01Q 1/243; H01Q 1/50; H02J 7/025

USPC ........................................................ 343/702
See application file for complete search history.

(56) References Cited

U.S. PATENT DOCUMENTS

| 2005/0084817 A1 | 4/2005 | Teng | |
|---|---|---|---|
| 2011/0109517 A1* | 5/2011 | Arima | ............... G06F 1/1616 |
| | | | 343/702 |
| 2012/0235635 A1 | 9/2012 | Sato | |

(Continued)

FOREIGN PATENT DOCUMENTS

| EP | 2 498 336 A2 A3 | 9/2012 |
|---|---|---|
| EP | 2 858 172 A1 | 4/2015 |

OTHER PUBLICATIONS

Extended European Search Report dated Oct. 28, 2016 in Patent Application No. 15179975.6.

*Primary Examiner* — Jean B Jeanglaude
(74) *Attorney, Agent, or Firm* — Oblon, McClelland, Maier & Neustadt, L.L.P.

(57) ABSTRACT

A combination antenna includes a conductive block having at least one electrical component mounted on the surface. A metallic housing is connected to the conductive block via at least one electronic element having a front surface and a rear surface. The front surface includes one or more plates separated by gaps of a predetermined width. The rear surface includes a continuous plate separated from the front surface by a gap of a second predetermined width. One or more antenna feeds are disposed between the front surface and the rear surface of the metallic housing and are connected to the metallic housing directly or via the at least one electronic element. A grounding plane includes one or more grounding points connected to the front surface and the rear surface directly or via the at least one electronic element.

20 Claims, 23 Drawing Sheets

(56) References Cited

U.S. PATENT DOCUMENTS

2013/0009828 A1 1/2013 Pascolini
2014/0327585 A1 11/2014 Sato
2014/0361941 A1 12/2014 Jenwatanavet et al.

* cited by examiner

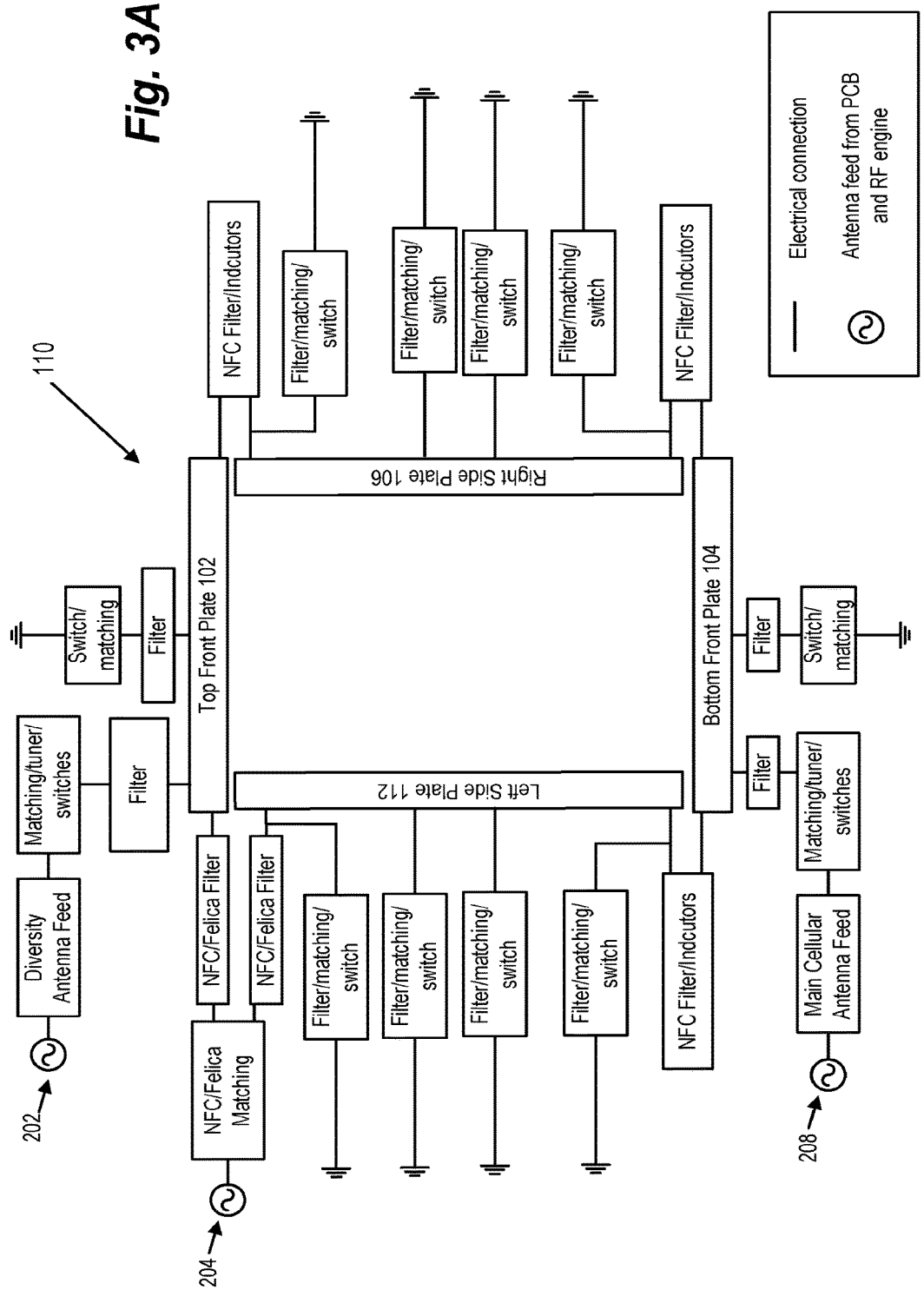

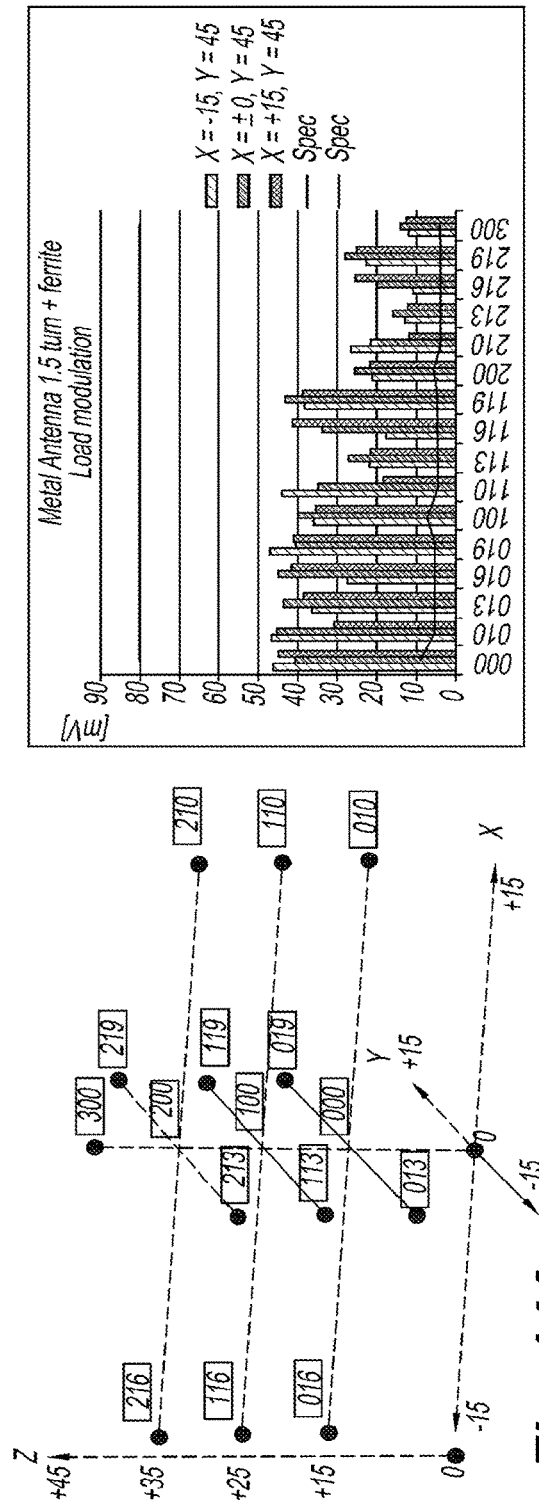
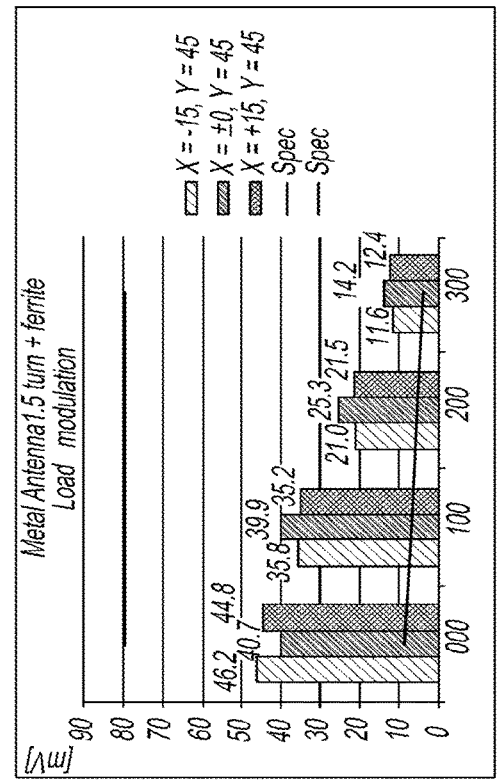
Fig. 14A
Fig. 14B
Fig. 14C

COMBINATION ANTENNA

CROSS-REFERENCE TO RELATED APPLICATIONS

The present application is a continuation application which claims the benefit of priority under 35 U.S.C. § 120 of U.S. patent application Ser. No. 14/738,689, filed Jun. 12, 2015, the entire contents of each of which are incorporated herein by reference.

BACKGROUND

Field of Disclosure

This disclosure relates to a combination antenna for electronic devices, such as SmartPhones, tablets, and the like, that incorporates one or more antenna feeds in order to function in a plurality of frequency ranges and incorporate one or more wireless communication technologies.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

As recognized by the present inventor, incorporating additional antennas to accommodate more frequency bands into electronic devices, such as Smartphones and tablets, becomes difficult due to space restrictions as well as increasing performances standards for the electronic devices. Along with cellular and WIFI antennas, Near Field Communication (NFC), FELICA, wireless changing, and FM radio antennas are increasingly being incorporated into the electronic devices. In addition, users expect electronic devices to have a smooth and sleek design, which has led to electronic devices being manufactured with metallic outer surfaces, which may degrade the performance of the antennas.

SUMMARY

In an exemplary embodiment, a combination antenna includes a conductive block having at least one electrical component mounted on the surface. A metallic housing is connected to the conductive block via at least one electronic element having a front surface and a rear surface. The front surface includes one or more plates separated by gaps of a predetermined width. The rear surface includes a continuous plate separated from the front surface by a gap of a second predetermined width. One or more antenna feeds are disposed between the front surface and the rear surface of the metallic housing and are connected to the metallic housing directly or via the at least one electronic element. A grounding plane includes one or more grounding points connected to the front surface and the rear surface directly or via the at least one electronic element.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 3A-3D are exemplary functional diagrams of a front metallic cover of a combination antenna, according to certain embodiments;

FIGS. 14A-14C illustrate exemplary load modulation measurements for the NFC/FELICA antenna feed, according to certain embodiments;

DETAILED DESCRIPTION

Figure 1A:
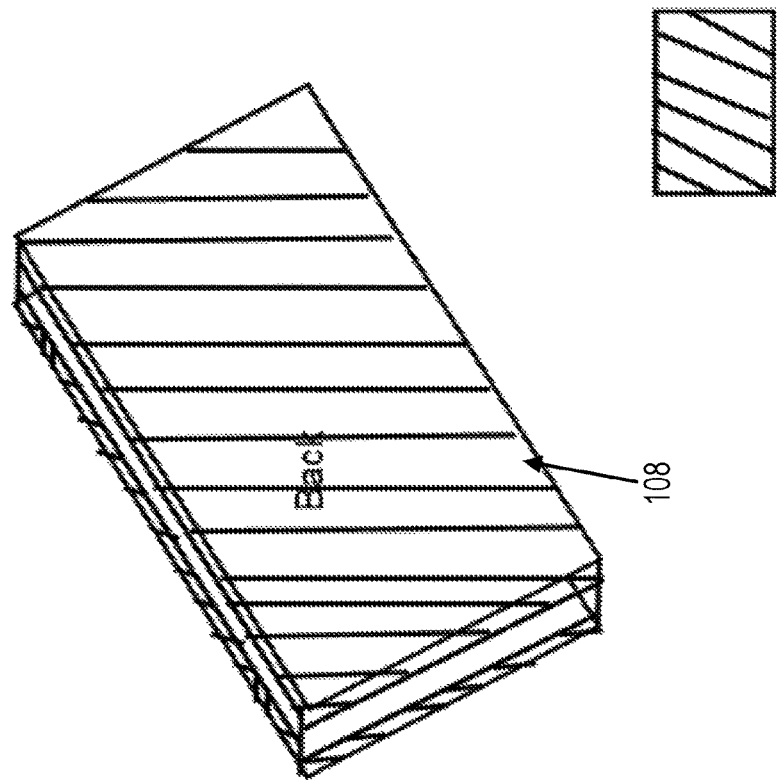
FIGS. 1A and 1B are exemplary illustrations of a combination antenna, according to certain embodiments.
Figure 1A:
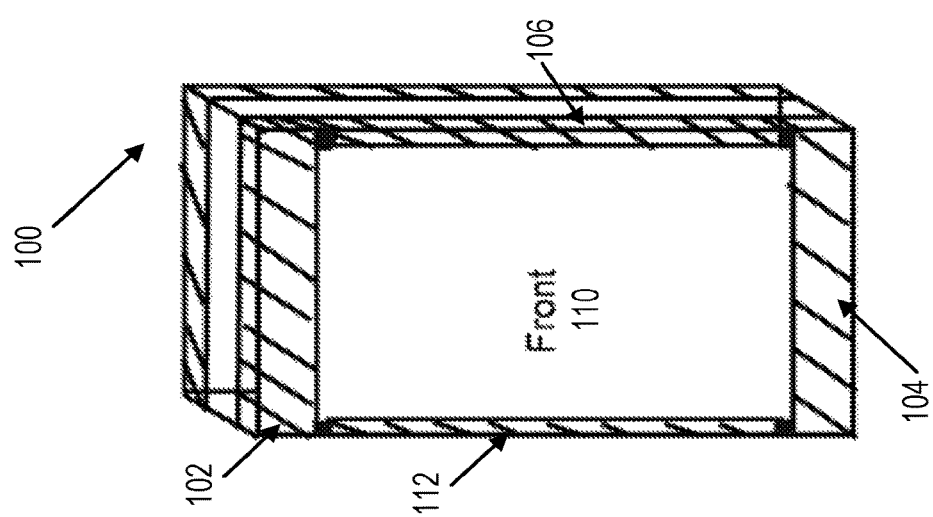

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "about," and similar terms generally refer to ranges that include the identified value within a margin of 20%, 10%, or 5%, and any values therebetween.

Aspects of the related disclosure are related to a combination antenna for electronic devices, such as SmartPhones, tablets, and the like, that incorporates one or more antenna feeds in order to function in a plurality of frequency ranges and incorporate or more wireless communication technologies. Examples of the wireless communication technologies include main cellular antennas, diversity cellular antennas, main and sub WIFI antennas, GPS and/or GLONASS, NFC, FELICA, RFID, FM, and wireless charging. According to certain embodiments, back metallic cover and front metallic cover conductive traces of the electronic device act as radiators for the one or more antenna feeds of the combination antenna.

FIG. 1A is an exemplary illustration of a combination antenna 100, according to certain embodiments. The combination antenna 100 is a metallic housing that is an external surface of the electronic device according to some implementations. The combination antenna 100 includes a front metallic cover 110 and a back metallic cover 108 that is separated by a gap filled with a non-metallic material. In other embodiments, the gap between the front metallic cover 110 and the back metallic cover 108 may be any distance greater than or less than 0.5 mm.

Figure 1B:
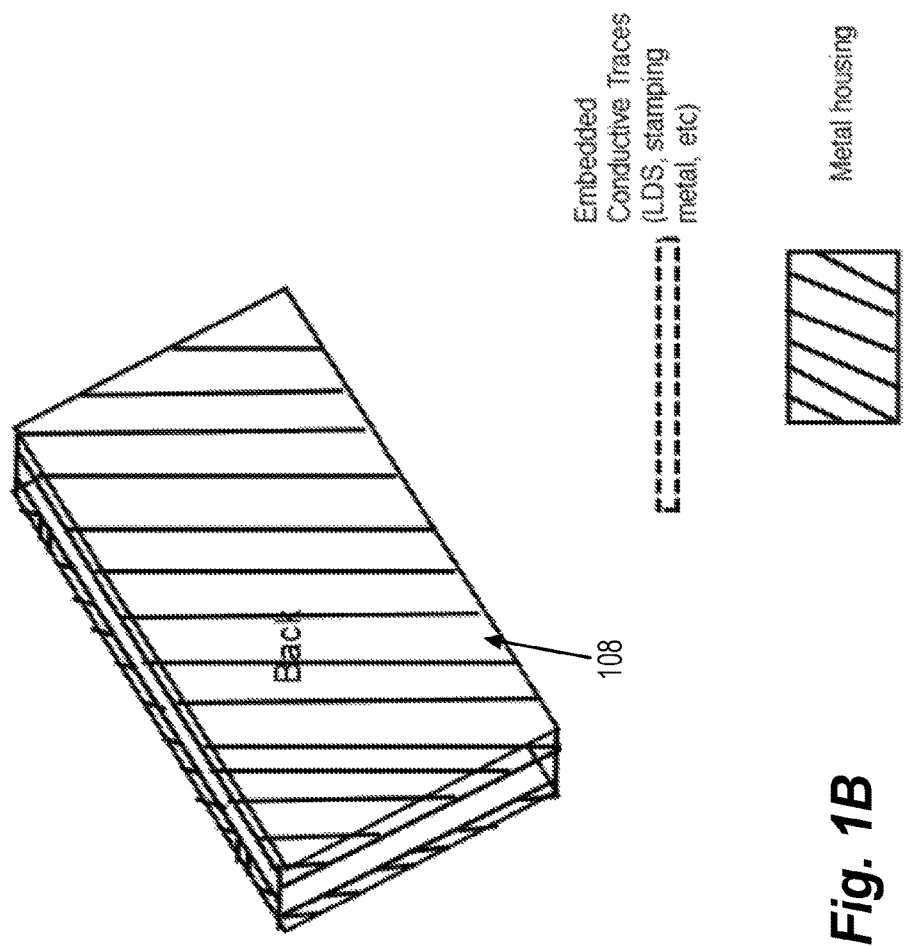
Figure 1B:
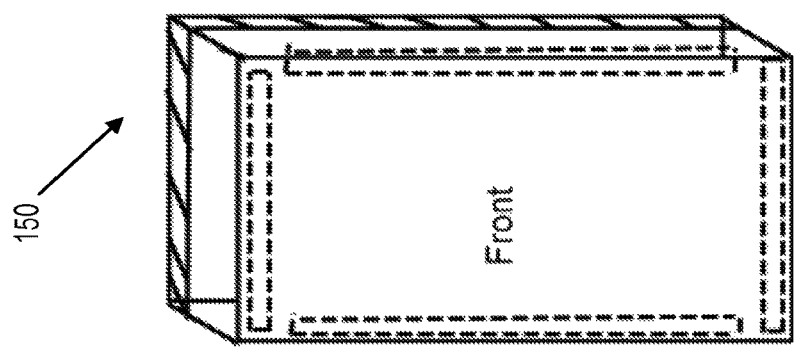

FIG. 1B is an exemplary illustration of a combination antenna 150 with conductive traces, according to certain embodiments. In FIG. 1B, conductive traces may be mounted on a mold of the combination antenna 100 with paint or embedded within the mold, which may be invisible to the naked eye. For example, the metal plates of the front metallic cover 110 shown in FIG. 1A can be replaced by embedded conductive traces as shown in FIG. 1B. Hence the word "plate" used throughout the disclosure can refer to both metal plates and conductive traces. Throughout the disclosure, the combination antenna 100 with the front metallic cover and the combination antenna 150 with the conductive traces can be referred to interchangeably.

As shown in FIG. 1A, the front metallic cover 110 can be a metallic plate that includes a top front plate 102, a bottom front plate 104, a right side plate 106, and left side plate 112. The top front plate 102 and the bottom front plate 104 are separated from the right side plate 106 and the left side plate 112 by gaps filled with the non-metallic material. According to one embodiment, the gaps between the top front plate 102 and the right side plate 106 and left side plate 112 and the gaps between the bottom front plate 104 and the right side plate 106 and left side plate 112 are 0.5 mm and include one or more electrical components, such as filters, matching circuitry, and tuning circuitry that optimize performance of the combination antenna 100. In other embodiments, the gaps between the top front plate 102, bottom front plate 104, right side plate 106, and left side plate 112 may be any distance greater than or less than 0.5 mm.

The combination antenna 100 in FIGS. 1A and 1B is shown as a conductive rectangular-shaped path but may also be of a non-rectangular shape, such as circular or a rounded shape, so as to accommodate a periphery of the electronic device on which it is used. The shape may have rounded corners or tapered corners or any other shape.

Figure 2:
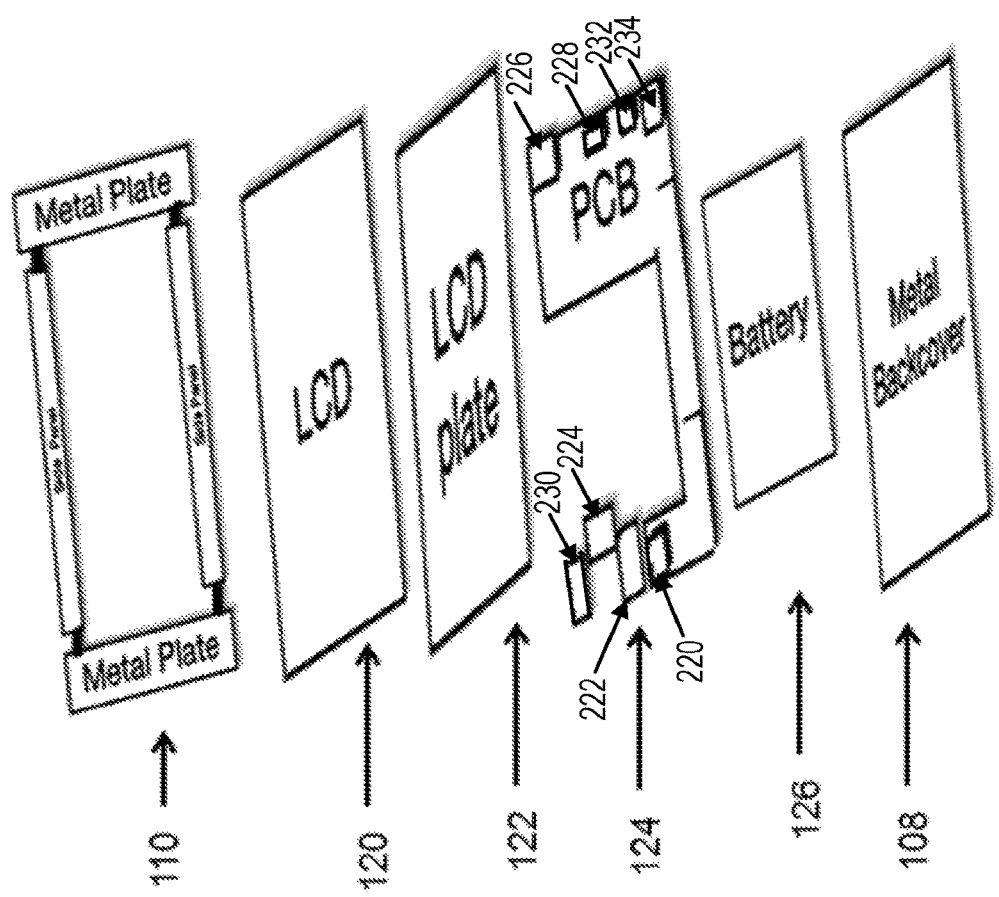
FIG. 2 is an exemplary illustration of an expanded view of a combination antenna in a mobile device, according to certain embodiments.

FIG. 2 is an exemplary illustration of an expanded view of a combination antenna 100 in a mobile device, according to certain embodiments. For simplicity of description and illustration, the feeding and grounding components of the combination antenna 100 are not shown. The electromechanical components of the electronic device are included between the front metallic cover 110 and the back metallic cover 108 of the combination antenna 100. For example, the electromechanical components may include a microphone 220, USB connection 222, speaker 224, front camera 232, rear camera 226, ear speaker 228, audio jack 230, vibration motor 234, PCB 124, LCD 120, LCD plate 122, battery 126, and the like. A non-conductive mold frame (not shown) may also be included between the front metallic cover 110 and the back metallic cover 108 of the combination antenna. In addition, flex-film with electronic-mechanic components can also be integrated into electronic devices.

FIG. 3A is an exemplary functional diagram of a front metallic cover 110 of a combination antenna 100, according to certain embodiments. The blocks of the functional diagram of the front metallic cover 110 illustrate exemplary circuitry that is included within gaps between the top front plate 102, bottom front plate 104, right side plate 106, and left side plate 112. The circuitry includes one or more feeding points for the one or more radiofrequency (RF) antenna feeds, NFC/FELICA feed, one or more grounding points, inductors, filters, matching circuits, switching circuits, diplexers, and any other types of circuitry that optimize the performance of the combination antenna 100.

The locations of the circuitry on the front metallic cover 110 are merely exemplary, and the locations of the feed points, grounding points, filters, and other electronic components, may be located at any position on the front metallic cover 110 based on the types of antenna feeds installed in the electronic device, improved antenna tuning, frequency ranges, and the like. In addition, the number and type of antenna feeds connected to the front metallic cover 110 are merely exemplary, and any number of type of antenna feeds can be included in the combination antenna 100 based on the wireless technologies, frequency ranges, and other operating characteristics of the electronic device.

According to some implementations, the top front plate 102 includes a grounding point and a diversity/sub antenna feed 202. In some aspects, the diversity/sub antenna is a cellular antenna that receives one or more RF signals to determine signal strength in one or more frequency bands. The data received by the diversity/sub antenna is used to determine optimum transmission characteristics for the main cellular antenna 208 and the other antennas on the electronic device. Filters and/or switching and matching circuitry are included between the grounding point and the top front plate 102 based on desired tuning characteristics. In addition, the diversity antenna feed 202 and is electrically connected to the top front plate 102 via filters and matching, tuning, and/or switching circuits. Other types of antenna feeds can also be included at the top front plate 102 of the front metallic cover 110. In some implementations, the positioning system antenna feeds can share feed locations with the diversity antenna feed 202.

The bottom front plate 104 also includes a grounding point and antenna feeds for a main cellular antenna feed 208. Filters and/or switching and matching circuitry are included between the grounding point and the bottom front plate 104 based on desired tuning characteristics. In addition, the main cellular antenna feed 208 is electrically connected to the bottom front plate 104 via filters and matching, tuning, and/or switching circuits. Other types of antenna feeds can also be included at the bottom front plate 104 of the front metallic cover 110.

The right side plate 106 and left side plate 112 are electrically connected to at least one grounding point via filters and/or matching circuitry. For example, in FIG. 3A, there are a total of four grounding points connected to the left side plate 112 and the right side plate 106. In addition, the combination antenna 100 also includes a Near Field Communication (NFC)/FELICA antenna feed 204 as well as circuitry to support the NFC and FELICA technologies. For example, the NFC/FELICA antenna feed 204 as well as the NFC filters and/or inductors are electrically connected between the left side plate 112 and bottom front plate 104, right side panel 106 and bottom front plate 104, and top front plate 102 and right side panel 104. Between the left side plate 112 and top front plate 102, one or more NFC/FELICA filters are connected to matching circuitry.

Alternatively, the NFC/FELICA antenna feed 204 and matching circuitry could be located between the right side plate 106 and the top front plate 102, between the right side plate 106 and the bottom front plate 104, or between the left side plate 112 and the bottom front plate 104. The NFC/FELICA circuitry described by FIG. 2 illustrates balance matching. However, the NFC/FELICA circuitry can also be designed to provide imbalance matching of the NFC/FELICA antennas. Details regarding the NFC/FELICA antenna feed 204 of the combination antenna 100 are discussed further herein.

Throughout the disclosure, references are made to one or more types of circuitry that connect the combination antenna 100 to one or more grounding points, antenna feeds, and the like. For example, filters, matching circuitry, and/or switching circuitry are used to tune the one or more antenna feeds of the combination antenna 100 to one or more frequency bands to optimize performance of the combination antenna. In some implementations, high band (HB) pass filters connect the one or more cellular antenna feeds to the combination antenna 100 and allow high frequency signals to pass while blocking signals with lower frequencies. Low band pass (LB) filter bridges allow lower frequency signals to pass while blocking signals with higher frequencies, such as cellular, WIFI, and GPS signals. In addition, NFC/FELICA filters are bandpass or low band filters that allow signals in the NFC frequency range to pass. Wireless charging and FM radio filters are also bandpass filters that allow one or more frequency bands to pass. Other types of filters, matching circuits, and switches may also be used.

Figure 3B:
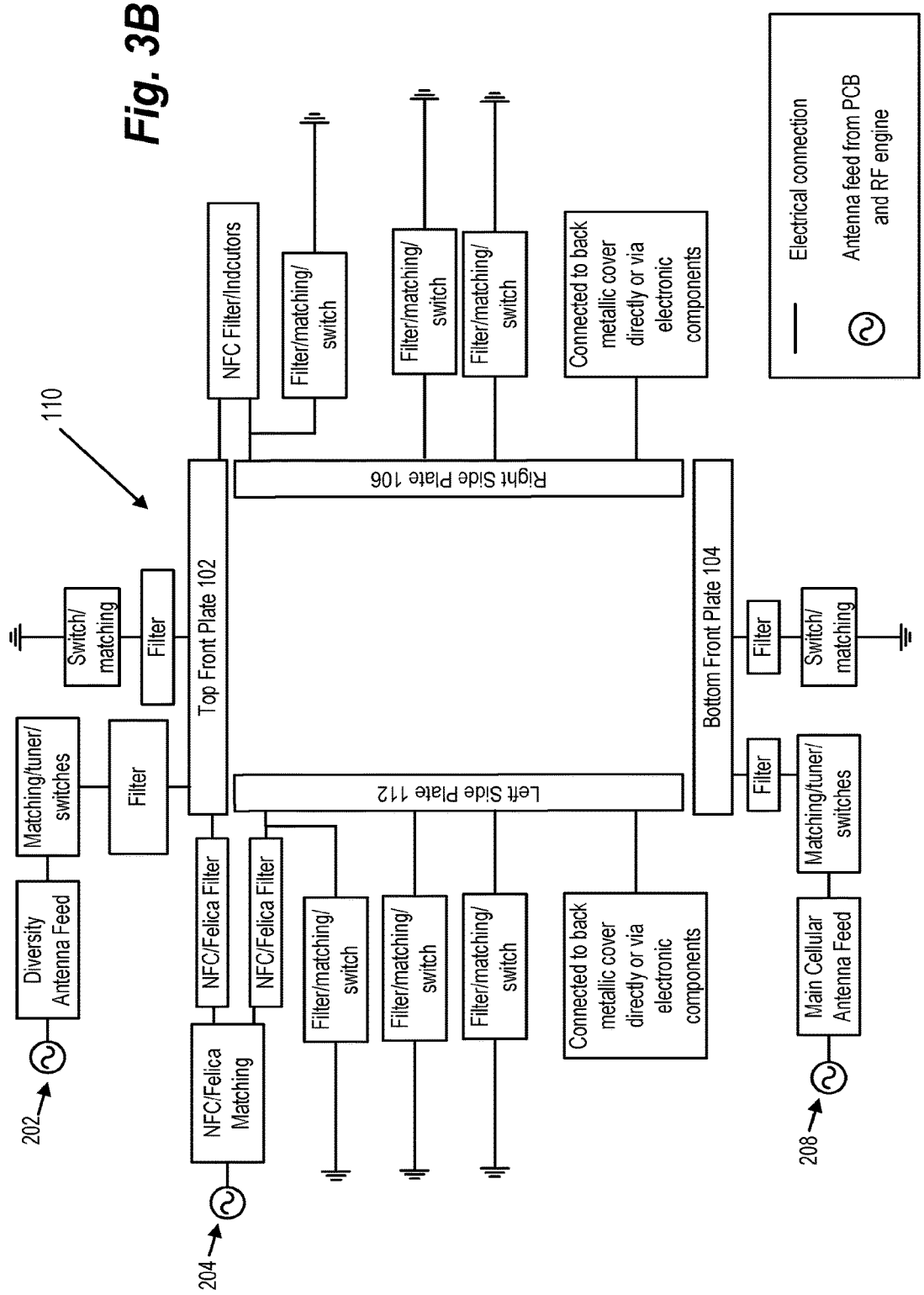
Figure 3C:
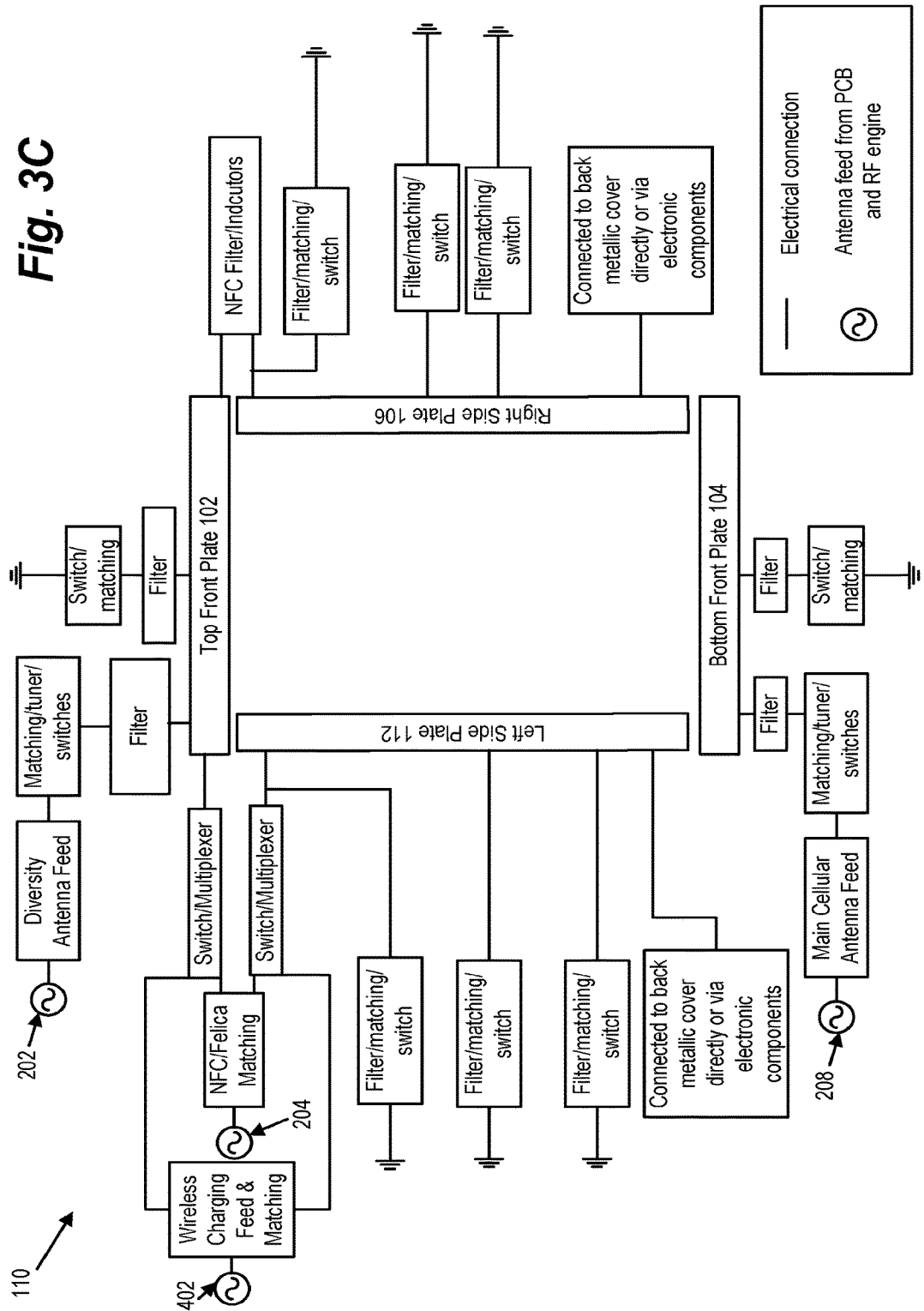
Figure 3D:
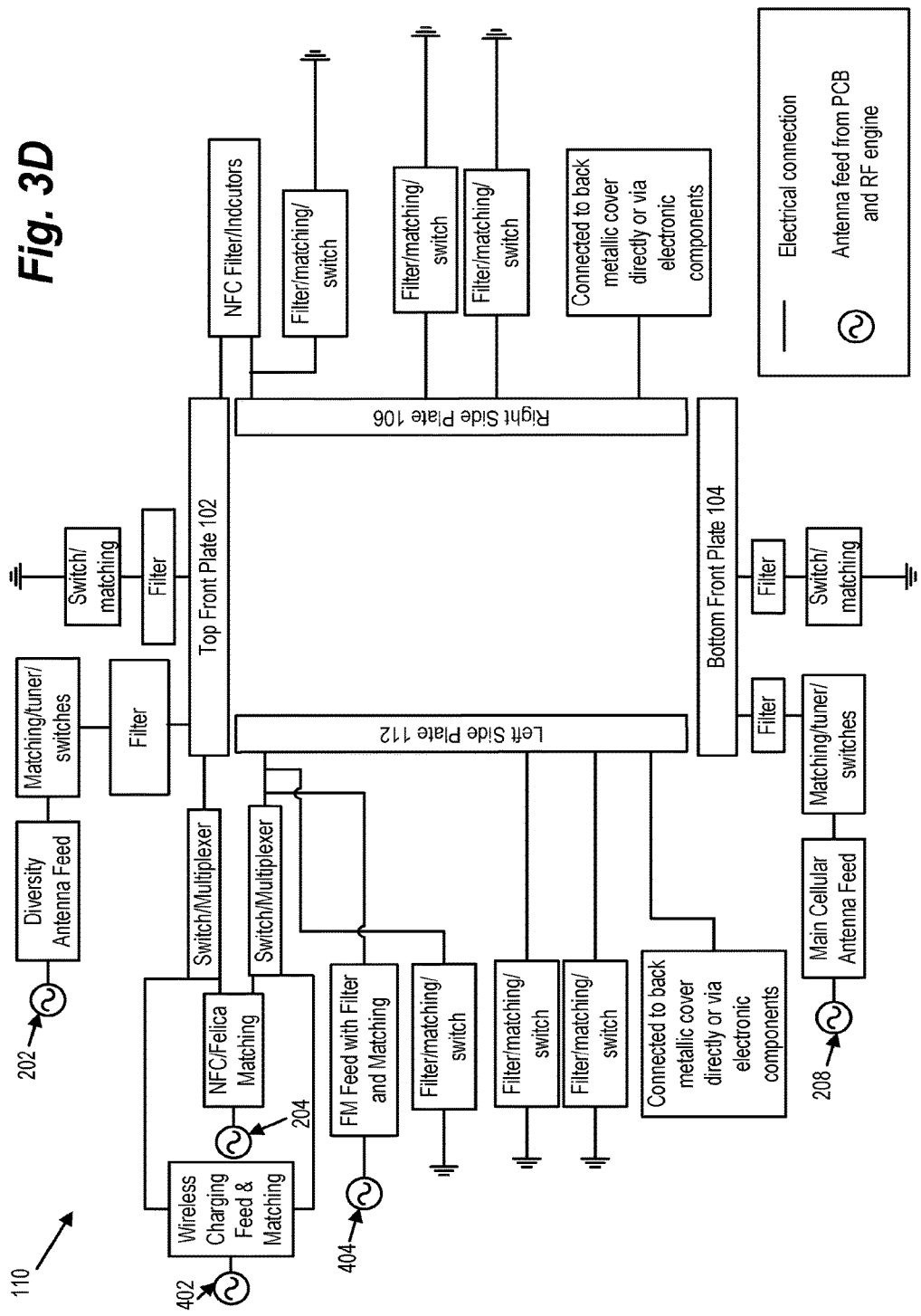

FIGS. 3B-3D are exemplary functional diagrams of a front metallic cover 110 of a combination antenna 100, according to certain embodiments. FIG. 3B includes the components described with respect to FIG. 3A except that the bottom metal plate 104 is not included as part of the NFC/FELICA antenna. Rather, the back metallic cover 108 is used as part of the NFC/FELICA antenna and is connected to the left side plate 112 and/or right side plate 106 either directly or via one or more electronic components.

FIGS. 3C and 3D are also exemplary functional diagrams of a front metallic cover 110 of a combination antenna 100, according to certain embodiments. The front metallic cover 110 illustrated in FIGS. 3C and 3D include the components described with respect to FIG. 3B. The front metallic cover 110 illustrated by FIG. 3C also includes circuitry to accommodate wireless charging. For example, the wireless charging antenna feed 402 with filters and matching circuitry are connected between the left side plate 112 and the top front plate 102 and are in parallel with the NFC/FELICA filters and matching circuitry. For co-existence with NFC/FELICA and wireless charging, switch can be used. The front metallic cover 110 illustrated by FIG. 3D also includes frequency modulation (FM) radio functionality in the combination antenna 100 in addition to the components shown by the illustration of the functional diagram of the front metallic cover 110 described by FIG. 3C. For example, the FM filter, matching circuitry, and FM radio antenna feed 404 are connected to the left side plate 112 in FIG. 3D.

Figure 4B:
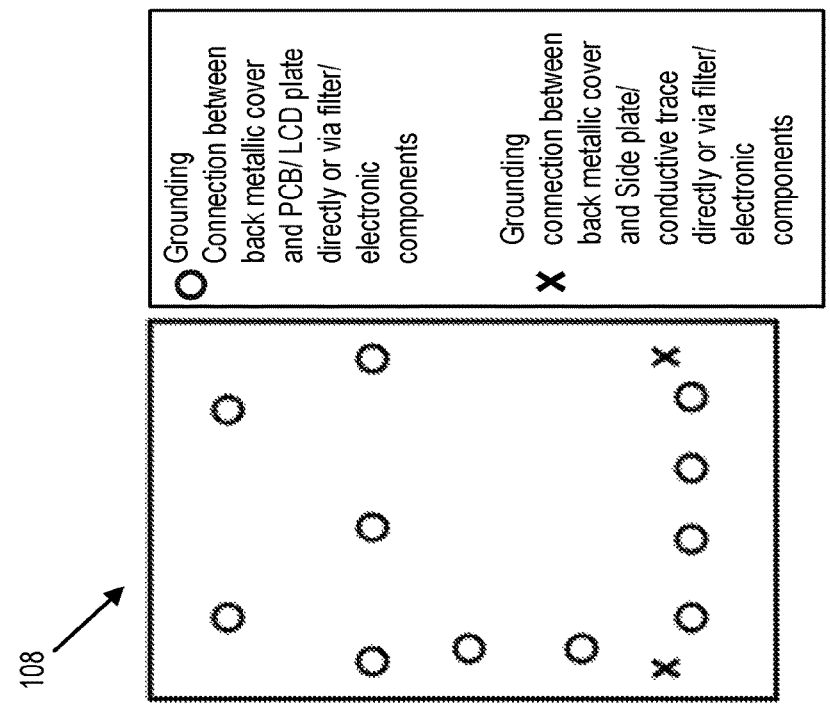
FIGS. 4A and 4B are exemplary functional diagrams of a back metallic cover of a combination antenna, according to certain embodiments.
Figure 4A:
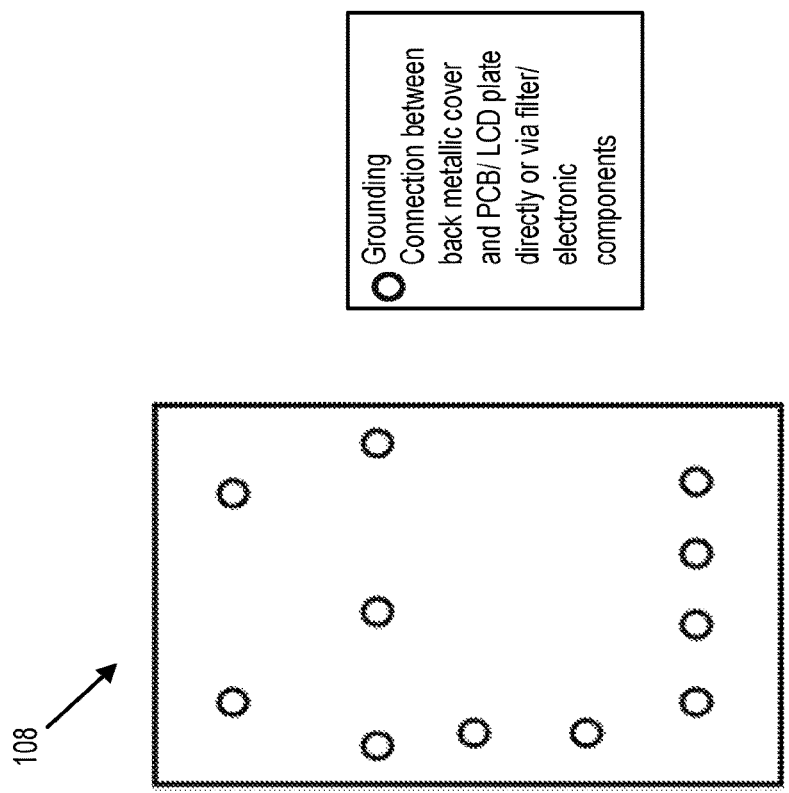

FIGS. 4A and 4B are exemplary functional diagrams of a back metallic cover 108 of a combination antenna 100, according to certain embodiments. In some aspects, an external surface of the back metallic cover 108 is smooth and continuous. Slits in the surface of the back metallic cover 108 to provide for antenna components and/or functionality may not be used but holes/opening can be made to accommodate other electrical components and/or functions, such as camera, camera lens, flash light, sensor, etc., or other types of openings. As shown in FIG. 4A, the back metallic cover 108 is electrically connected to one or more grounding points on the PCB 124 and/or LCD plate 122 at one or more locations via filters, matching circuits, and/or switching circuits. As shown in FIG. 4B, in addition to the grounding points on the PCB 124 and LCD plate 122, the back metallic cover 108 can also include grounding connection points to the right side plate 106, left side plate 112, and/or conductive traces. The back metallic cover 108 can also be surrounded by an additional metallic or non-metallic cover for the electronic device.

Figure 5A:
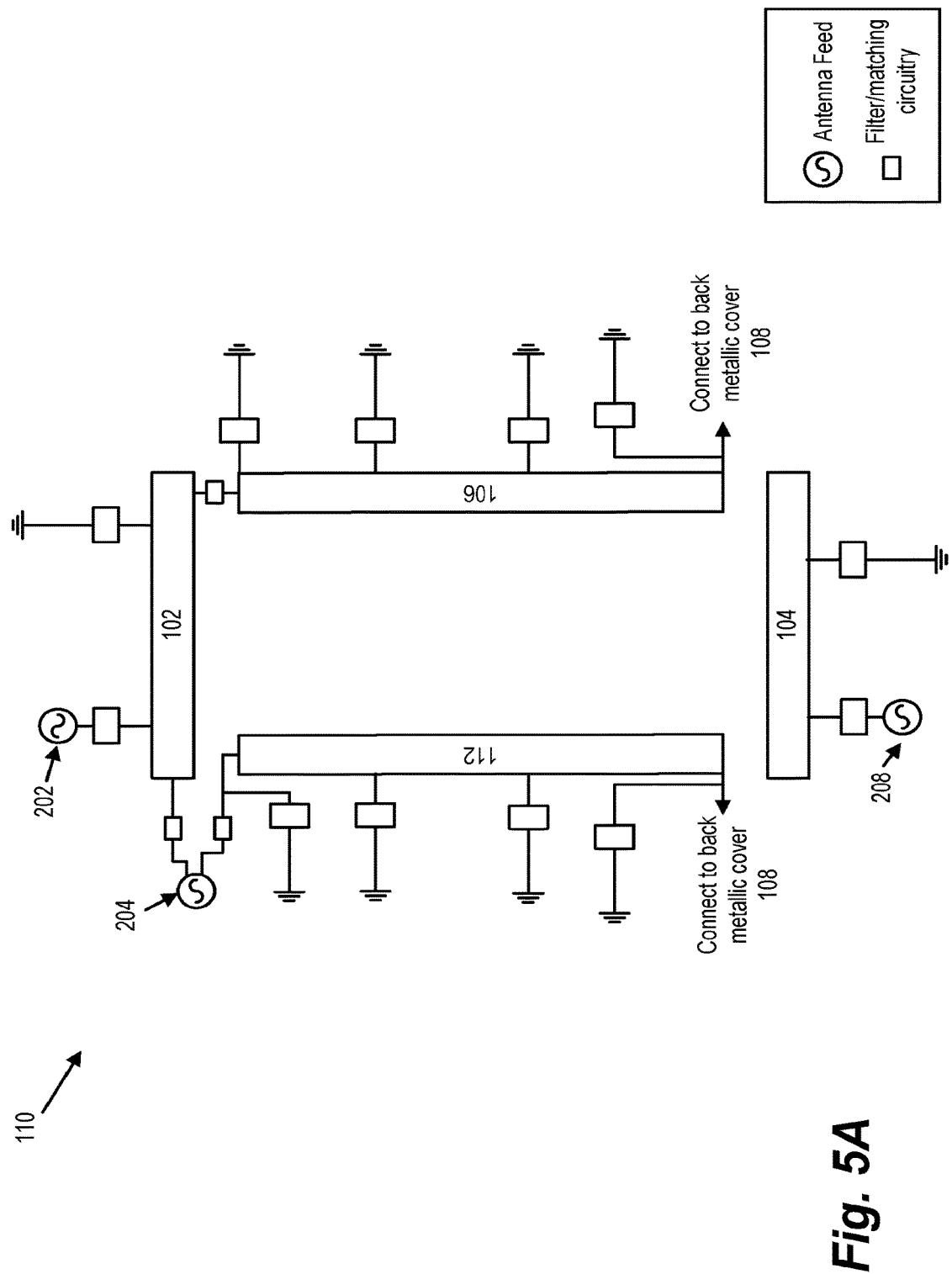
FIGS. 5A and 5B are exemplary functional diagrams of a front metallic cover of a combination antenna, according to certain embodiments.
Figure 5B:
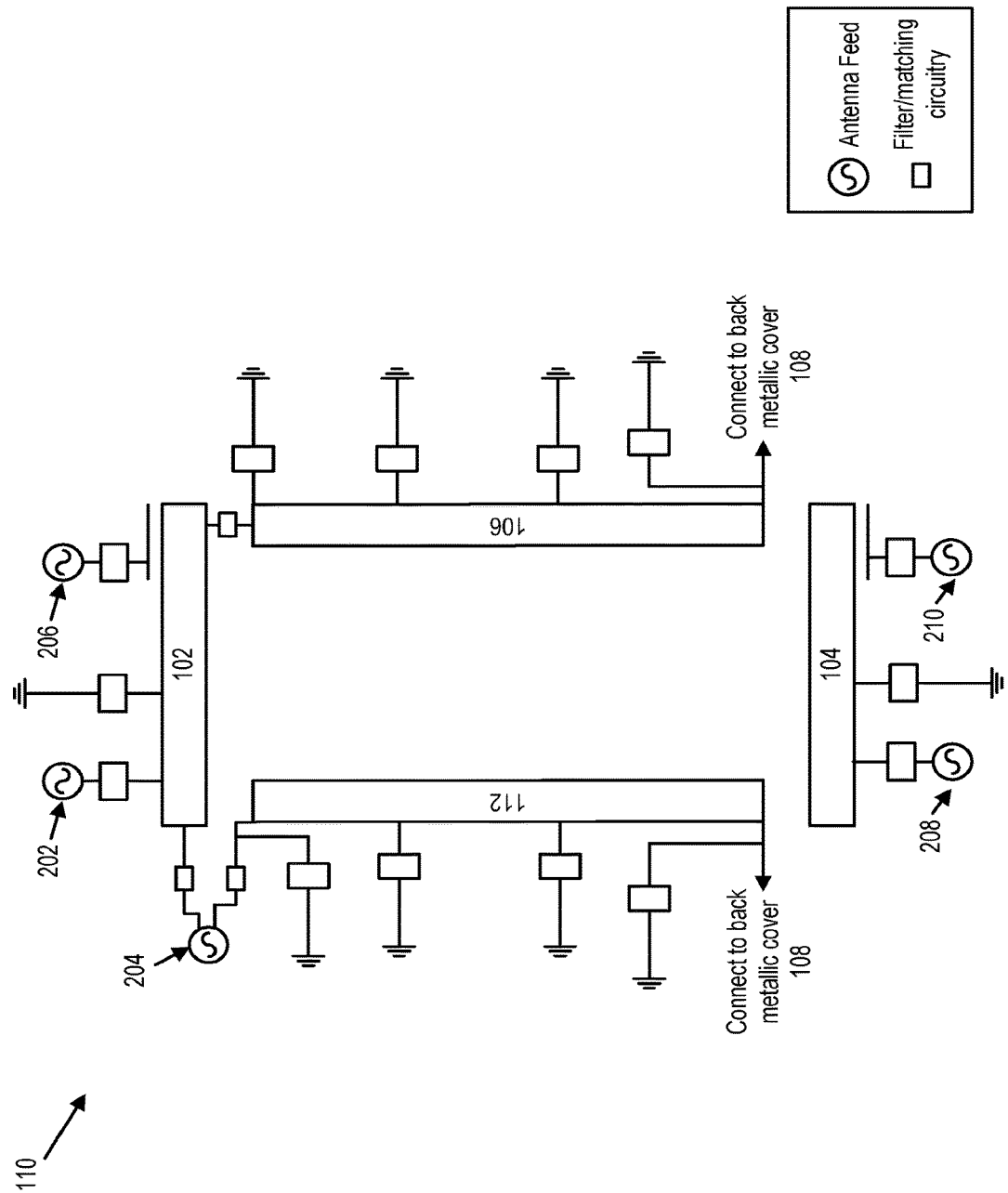

FIGS. 5A and 5B are exemplary functional diagrams of a front metallic cover 110 of a combination antenna 100, according to certain embodiments. FIG. 5A is the simplified version of the front metallic cover 110 illustrated by FIG. 3B. For example, the front metallic cover 110 includes a diversity/sub antenna feed 202, a NFC/FELICA antenna feed 204, and a main cellular antenna feed 208. The front metallic cover 110 of the combination antenna 100 also includes a plurality of grounding points and connections to the back metallic cover 108. In addition to the components described with respect to FIG. 5A, FIG. 5B also includes separated antennas that are not connected to the front metallic cover 110 or back metallic cover 108, such as a secondary main antenna 210 and secondary sub/diversity/GPS antenna 206. Other types of antennas can also be added to the combination antenna, according to some implementations.

Figure 6:
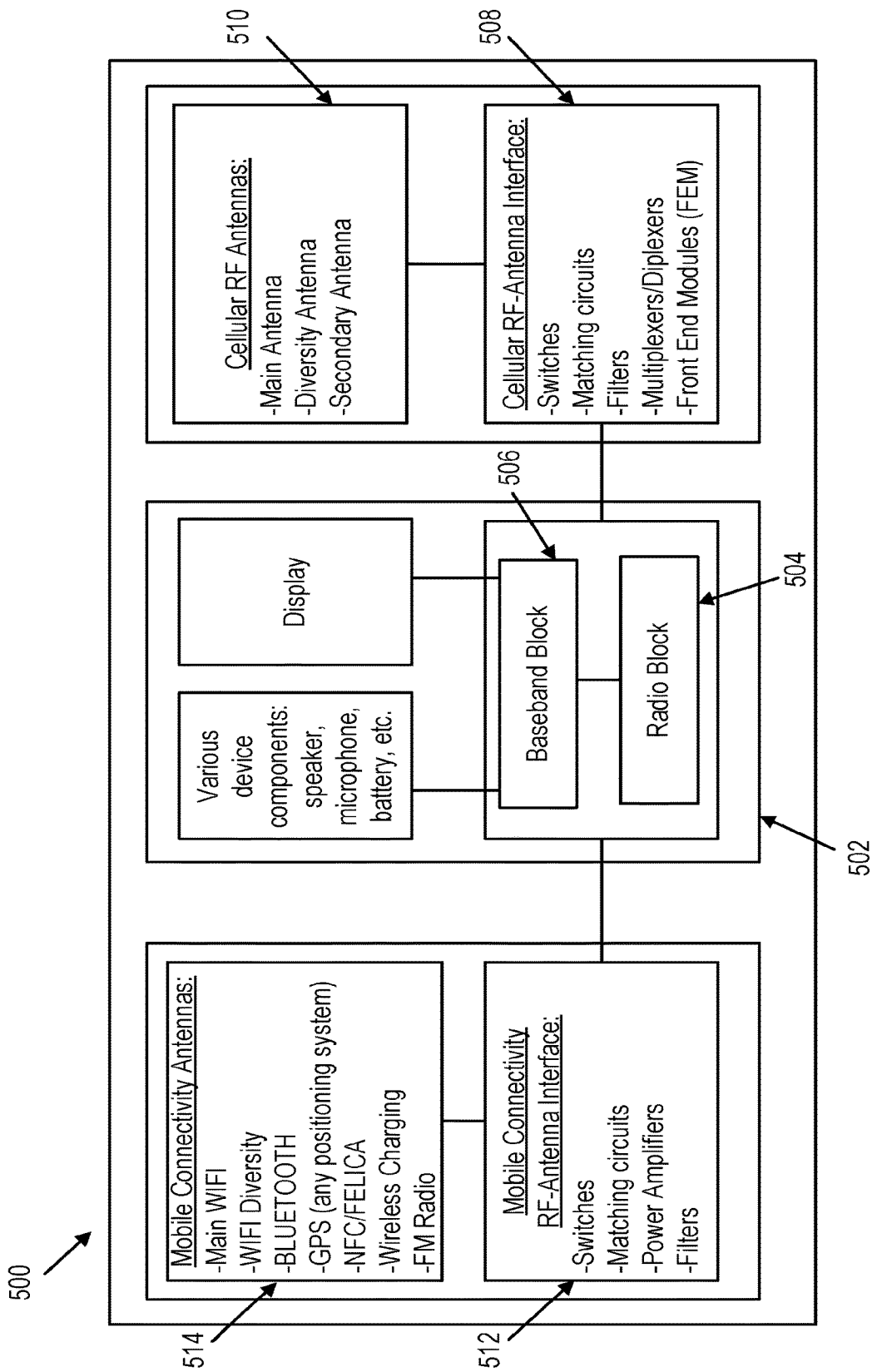
FIG. 6 is an exemplary block diagram of an electronic device with a combination antenna, according to certain embodiments.

FIG. 6 is an exemplary block diagram of an electronic device 500 with a combination antenna 100, according to certain embodiments. The block diagram for the electronic device 500 is merely exemplary and may include other components than those described herein. The electronic device 500 includes a grounding plane 502 with a radio block 504 and a baseband block 506. While the term "block" is used, it should be understood that the radio (RF) block 504 and the baseband block 506 may be plates or other objects having a two-dimensional surface on which circuit components may be mounted. In addition, the ground plane 502, LCD plate 122, and back metallic cover 108 can function as the ground plane for the combination antenna 100. Throughout the disclosure, the terms "block" and "ground plane" can be used interchangeably. The baseband block 506 and RF block 504 can include a processor, RF chipset, and the like, and are all mounted on PCB 124. Electronic components, such as camera, sensor, microphone, keys, and the like, can be mounted on flex-film.

In some implementations, the baseband block 506 connects to components of the electronic device other than combination antenna 100 and circuitry related to the combination antenna 100. For example, the baseband block 506 is electrically connected to electronic device components, such as a speaker, microphone, battery, display and the like. The radio block 504 provides a circuitry related to the combination antenna 100. For example, the combination antenna 100 incorporates one or more cellular antennas 510 and/or one or more mobile connectivity antennas 514. In some implementations, the cellular antennas 510 include a main antenna, a secondary antenna, and/or a diversity antenna and etc. The mobile connectivity antennas 514 includes any type of antenna for the electronic device other than the cellular antennas 510, such as a main WIFI antenna, a sub WIFI antenna, a BLUETOOTH antenna, a GPS or other positioning system antenna, a NFC/FELICA antenna, a wireless charging antenna, and/or a FM radio antenna.

The cellular antennas 510 are connected to the radio block 504 via circuitry that optimizes performance of the one or more cellular antennas 510. For example, the cellular antennas are connected to the radio block via a cellular RF-antenna interface 508. The cellular RF-antenna interface 508 includes switches, matching circuits, filters, multiplexers, diplexers, front end modules (FEM), and the like that establish one or more operating frequency bands for RF transmission and/or reception, tune the one or more cellular antennas, minimize antenna losses, and other functions that enhance the operations of the combination antenna 100.

In addition, the mobile connectivity antennas 514 are connected to the radio block 504 via circuitry that optimizes performance of the one or more mobile connectivity antennas 514. For example, the mobile connectivity antennas 514 are connected to the radio block via a mobile connectivity RF-antenna interface 512. The mobile connectivity RF-antenna interface 512 includes switches, matching circuits, filters, power amplifiers, and the like that establish one or more operating frequency bands for RF transmission and/or reception, tune the one or more cellular antennas, minimize antenna losses, and other functions that enhance the operations of the combination antenna 100. For example, one type of power amplifier used in the mobile connectivity RF-antenna interface 512 is a low noise amplifier (LNA) that amplifies one or more low-strength signals that are received by an antenna.

Figure 7B:
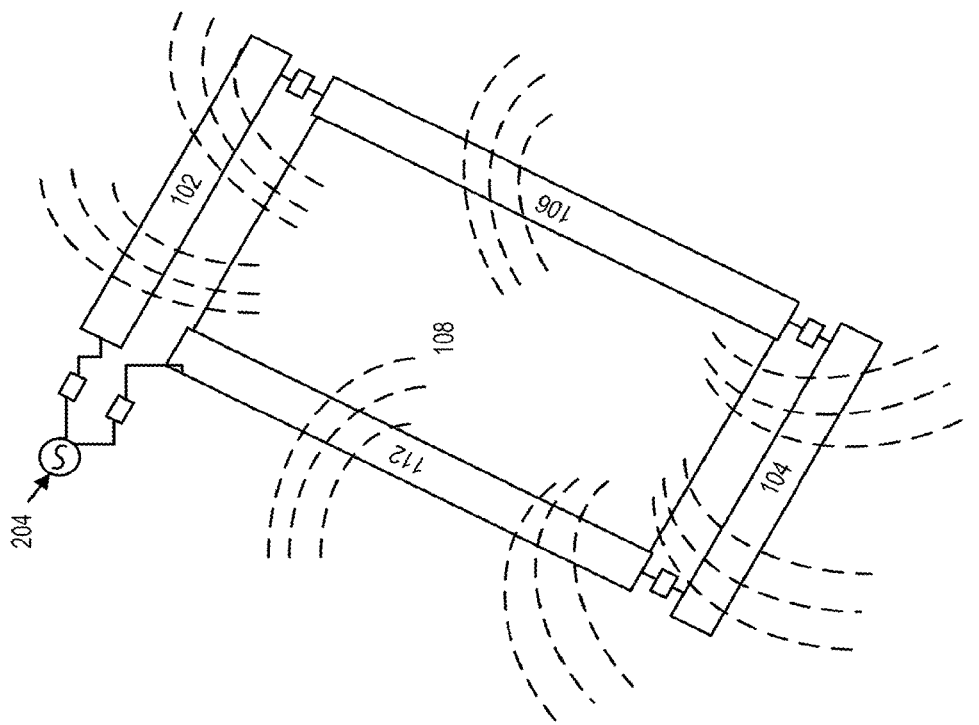
FIG. 7B is an exemplary illustration of magnetic fields established by NFC/FELICA antennas of a combination antenna, according to certain embodiments.
Figure 7A:
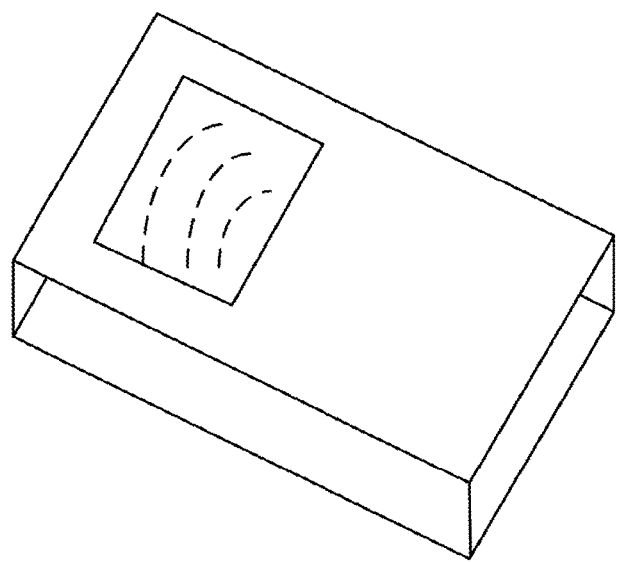
FIG. 7A is an exemplary illustration of magnetic fields established by conventional NFC/FELICA antennas, according to certain embodiments.
Figure 8B:
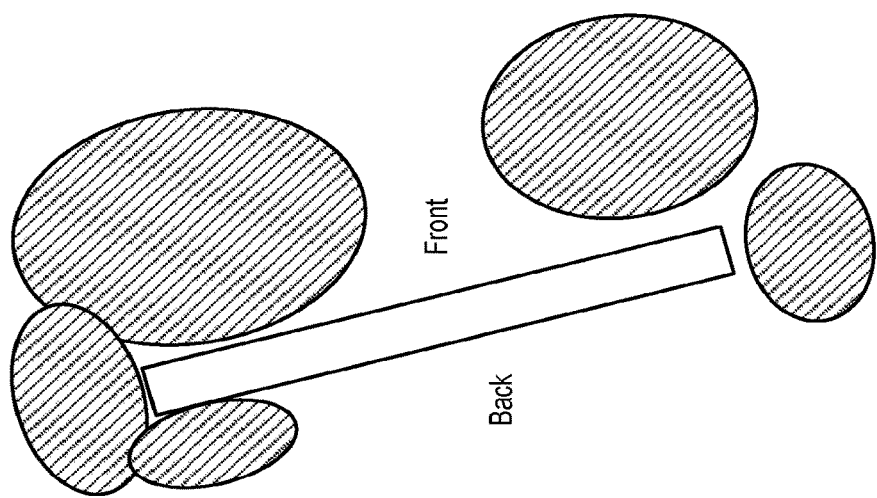
FIG. 8B is an exemplary illustration of an antenna beam volume for a NFC/FELICA antenna of a combination antenna, according to certain embodiments.
Figure 8A:
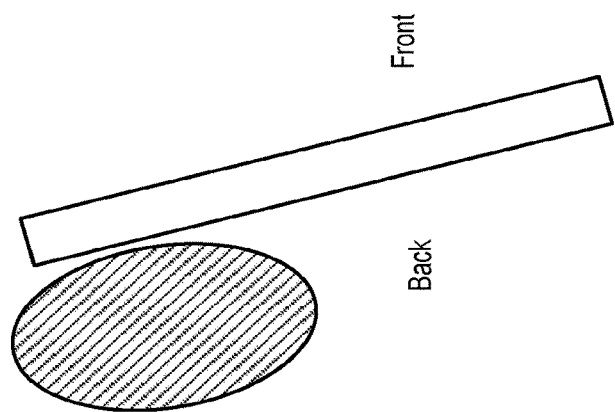
FIG. 8A is an exemplary illustration of a conventional NFC/FELICA antenna beam volume, according to certain embodiments.

FIGS. 7A and 7B are exemplary illustrations of magnetic fields established by NFC/FELICA antennas, and FIGS. 8A and 8B are exemplary illustrations of the operating beams generated by the NFC/FELICA antennas, according to certain embodiments. FIG. 7A is an illustration of a magnetic field established by a conventional N-turn NFC/FELICA coil. The NFC/FELICA coil is embedded beneath a back cover of the electronic device made of a non-conductive material, such as glass, wood, plastic, and the like. In some implementations, the NFC/FELICA coil is located underneath the non-conductive back cover.

FIG. 8A is an exemplary illustration of the operating beam generated by the conventional NFC/FELICA antenna of FIG. 7A. The magnetic field and operating beam established by the NFC/FELICA coil is located approximately at the location of the NFC/FELICA coil in the electronic device. For the NFC/FELICA antenna described by FIG. 7A to transmit and receive signals, the electronic device may need to be specifically oriented towards a NFC transmitter and/or receiver so that the magnetic field established by the NFC/FELICA coil is able to reach the NFC transmitter and/or receiver.

FIG. 7B is an illustration of a magnetic field established by an NFC/FELICA antenna feed 204 on the combination antenna 100, according to certain embodiments. As previously discussed, the NFC/FELICA antenna feed 204 is connected via filters, inductors, and/or matching circuitry to the combination antenna 100, such as between the top front plate 102 and left side plate 112 or between the bottom front plate 104 and the right side plate 106. In addition, the one or more matching and/or filter circuits between the top front plate 102, bottom front plate 104, right side plate 106, left side plate 112, and back metallic cover 108 contribute to the establishment, tuning, and optimization of the magnetic fields for the NFC/FELICA antenna feed 204.

FIG. 8B is an exemplary illustration of the operating beam generated by the conventional NFC/FELICA antenna of FIG. 7B. For example, the configuration of the NFC/FELICA antenna feed 204 and related circuitry on the combination antenna 100 allows the NFC/FELICA beam to have a front half spherical beam with a wide operating volume that is wider than the operating beam for the NFC/FELICA coil described with respect to FIG. 7A. In addition, NFC/FELICA antenna for the combination antenna 100 also includes one or more beams on the backside, top, and bottom, of the electronic device, which may be weaker than the operating beams on the front of the electronic device.

Figure 9B:
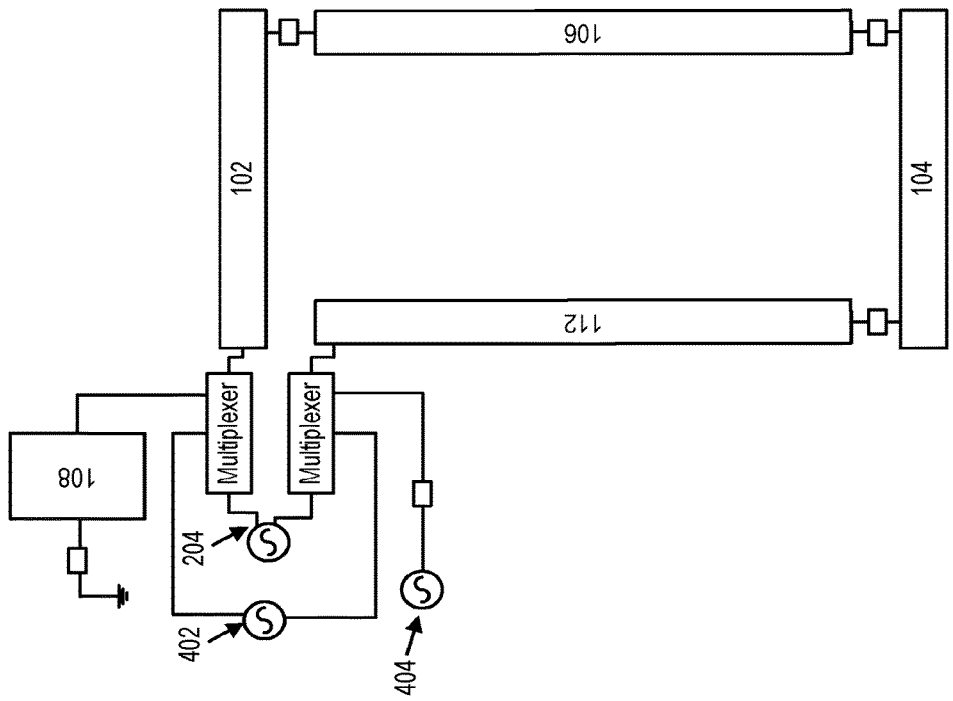
FIGS. 9A-9D are exemplary illustrations of FM radio antenna feed configurations for the combination antenna, according to certain embodiments.
Figure 9A:
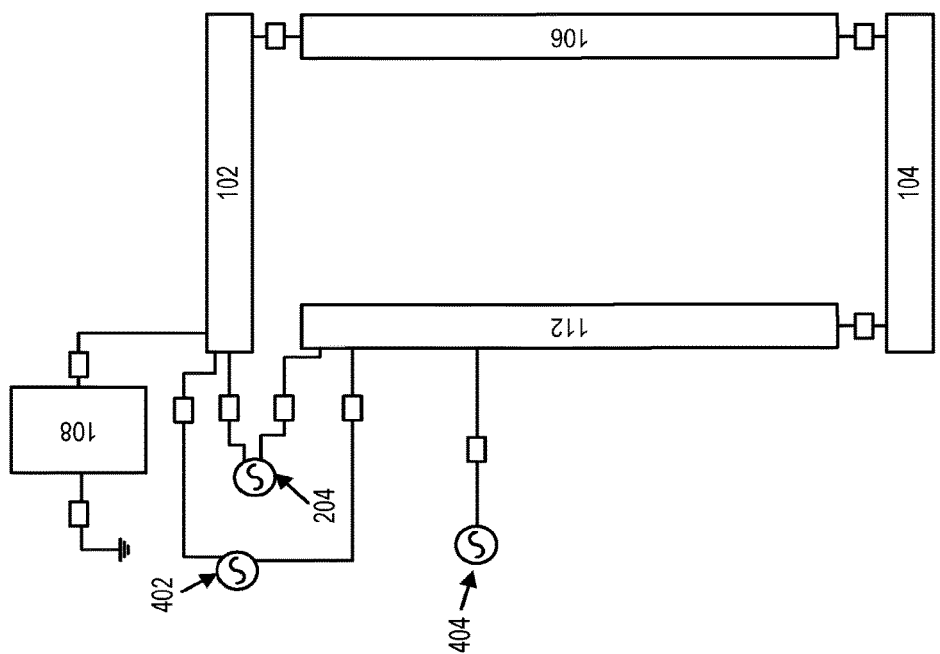
Figure 9D:
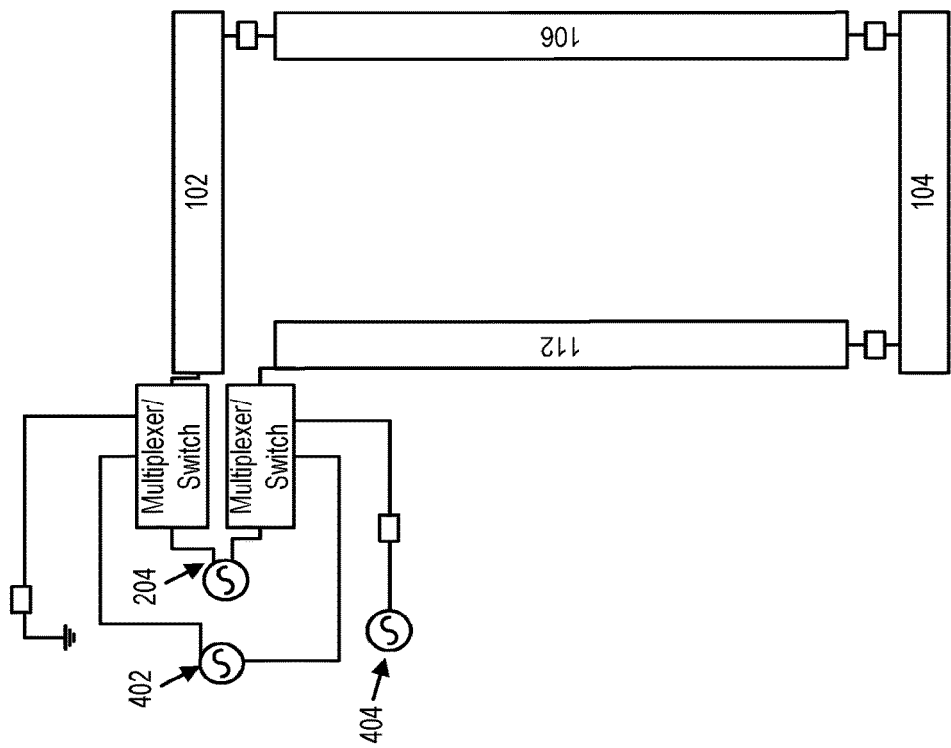
Figure 9C:
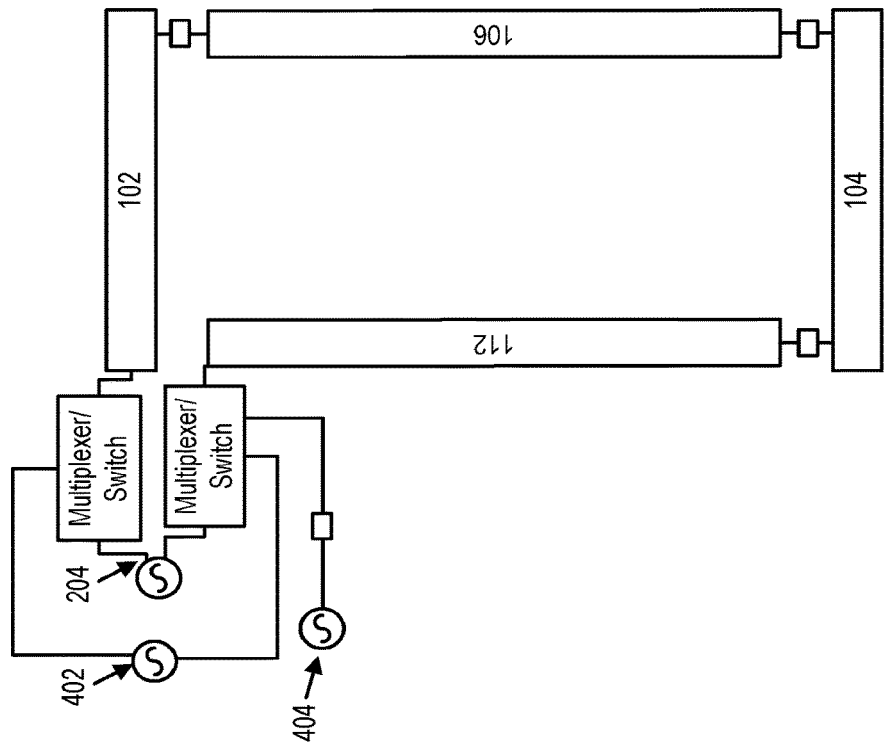

FIGS. 9A-9D are exemplary illustrations of FM radio antenna feed configurations for the combination antenna 100, according to certain embodiments. In FIGS. 9A-9D, only the NFC/FELICA antenna feed 204, wireless charging antenna feed 402, and FM radio antenna feed 404 are shown for simplicity of description. For example, FIG. 9c illustrates the antenna feed configuration described by FIG. 3D except that some grounding points and cellular antenna feed connections are not shown to simplify the illustration. Other types of antennas feeds, such as cellular, WIFI, GPS, and the like, may also be included in the combination antenna 100.

In FIG. 9A, the FM radio antenna feed 404 is connected to the left side plate 106 via filter and matching circuitry. The bottom front plate 104 is connected to the left side plate 112 and right side plate 106 via the filter, and the top front plate 102 is connected to the left side plate 112 via the filter and matching circuitry. In addition, the back metallic cover 108 is connected to the top front plate 102 and grounding point via the filter and matching circuitry. The FM radio antenna is a loop-type antenna feed that is grounded to the back metallic cover 108 of the combination antenna. The configuration of the filters and matching circuitry on the combination antenna 100 vary based on the operating frequency bands of the one or more antenna feeds.

In FIG. 9B, the FM radio antenna feed 404 shares a common feed with the NFC/FELICA antenna feed 204 and wireless charging antenna feed 402 via one or more multiplexer circuits between the top front plate 102 and left side plate 112 that allow the shared antenna feeds to operate in one or more frequency bands. In the example of FIG. 9B, the FM radio antenna is also a loop-type antenna feed that is grounded to the back metallic cover 108 of the combination antenna. In addition, the back metallic cover 108 is connected to the top front plate 102 and grounding point via the filter and matching circuitry.

The combination antenna shown in FIG. 9C includes the same components as FIG. 9A; however, the termination end of the FM antenna is open. In addition, the FM radio antenna shown in FIG. 9C is an open end monopole antenna feed. The combination antenna shown in FIG. 9D includes the same components as FIG. 9C; however, the termination end of the FM antenna is connected to a ground point via filter rather than the back metallic cover 108. In some implementations, the FM radio antenna shown in FIG. 9D is a loop-type antenna.

Figure 10A:
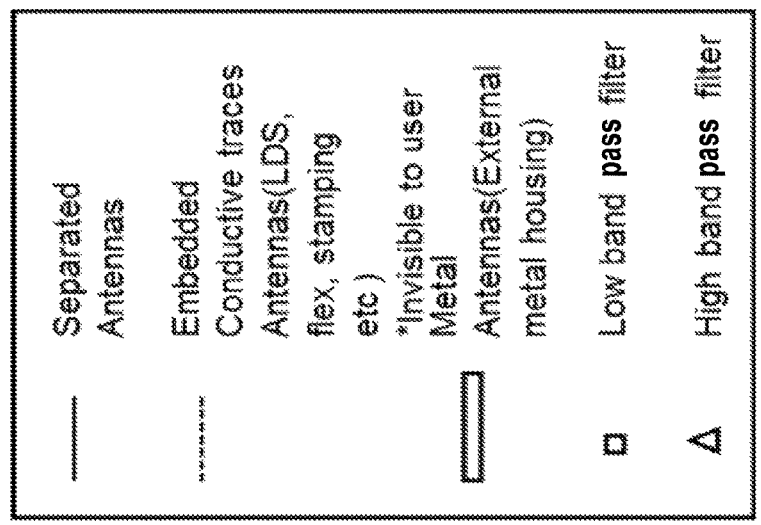
FIG. 10A is an exemplary illustration of a configuration of a combination antenna with a metal housing case, according to certain embodiments.
Figure 10A:
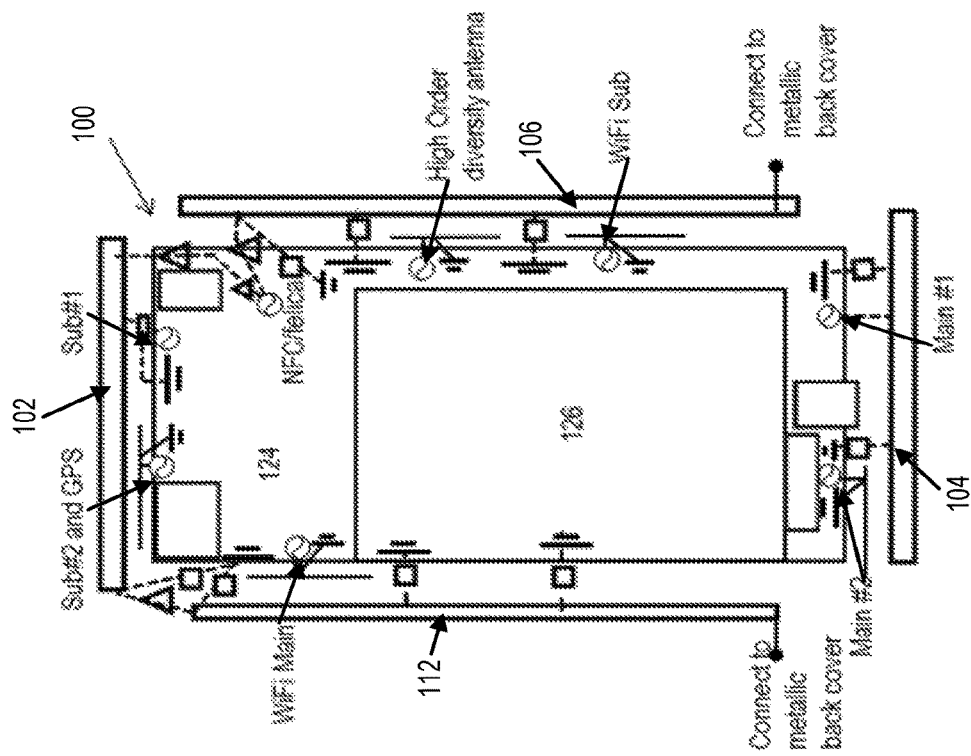

FIG. 10A is an exemplary illustration of a configuration of a combination antenna 100 with a metal housing case, according to certain embodiments. The antenna configuration of the combination antenna 100 in FIG. 10A corresponds to the antenna configuration illustrated in FIG. 3B. The antenna configuration includes a NFC/FELICA antenna feed, main and diversity/sub antenna primary feed, and one or more grounding connections. The low bandpass filter can include at least one inductor. In this example, an inductor having an inductance in the range between 33 nanoHenries (nH)-82 nH can be used as the low bandpass filter. For a high bandpass filter, a capacitor having a capacitance of 47 picoFarads (pF) is used, according to one implementation. The top metal plate 102, right side plate 106, left side plate 112, and back metallic cover 108 can be used as the NFC/FELICA antenna. Therefore, the top metal plate 102 can function in two modes, which include a sub/diversity/GPS cellular antenna mode and a NFC/FELICA antenna mode. In one implementation, the top metal plate is disconnected electrically from the right side plate 106 and left side plate 112 and functions as at least one of a cellular antenna and a GPS antenna.

In another exemplary embodiment, the back metallic cover 108 is connected to the ground plane for cellular antenna bands, and disconnected electrically from the ground plane for near field communication, wireless charging, and FM antenna bands. For example, the back metallic cover 108 operates in two modes including a first mode where the back metallic cover 108 performs near field communication, wireless charging, and FM communication with the front metallic cover 110. The back metallic cover 108 also operates in a second mode where the back metallic cover 108 functions as the ground plane for at least one cellular, WIFI, and GPS antenna.

In addition, the bottom metal plate 104 functions as the main cellular antenna having a first and a second main cellular antenna. In some implementations, multi-connection points for antenna feeds and grounding points can be connected at the edges of side panels. In one example, an antenna path is connected to the ground plane via high bandpass filter, and another antenna path is connected to the top metal plate 102 or the back metallic cover 108 via a low bandpass filter. In addition, one or more separated antennas can be added to combination antenna 100 that are not connected to the front metallic cover 110 or back metallic cover 108. For example, the separated antennas can include a main secondary antenna, sub/diversity secondary antenna, WIFI main antenna, WIFI sub antenna, and high order diversity antenna.

Figure 10B:
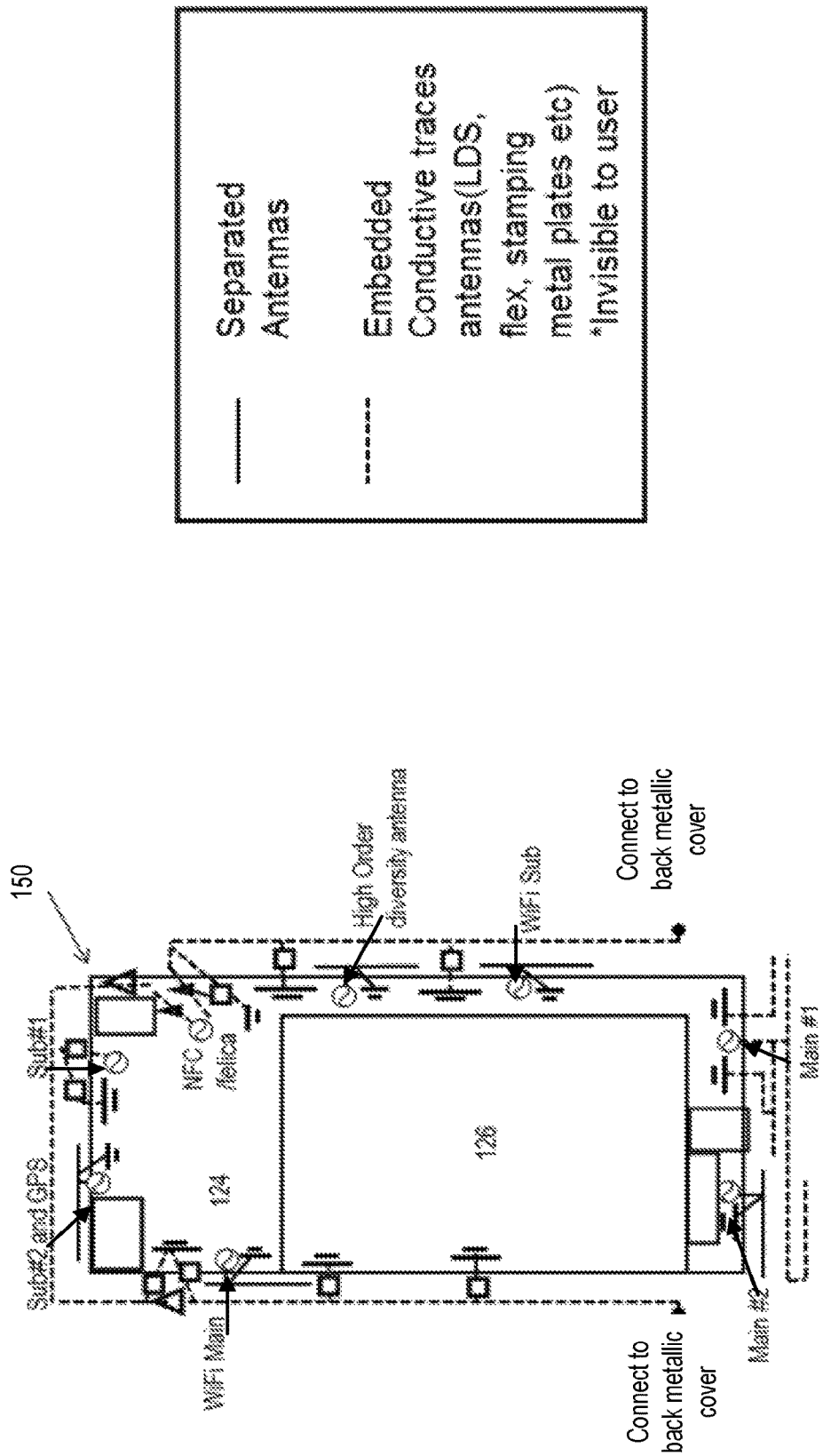
FIG. 10B is an exemplary illustration of a configuration for a combination antenna with embedded conductive traces, according to certain embodiments.

FIG. 10B is an exemplary illustration of a configuration for a combination antenna 150 with embedded conductive traces, according to certain embodiments. The operating principles of the combination antenna 150 illustrated by FIG. 10B correspond to the operating principles of the combination antenna 100 illustrated by FIG. 10A, but the front metallic cover 110 is replaced by embedded conductive traces. In some embodiments, the embedded conductive traces can include laser direct structuring (LDS), stamping metal plates, flex-film, and the like. The embedded conductive traces are can be mounted on a cosmetic surface in between molding, which can be invisible to users.

According to certain embodiments, the performance of the NFC/FELICA antenna feed 204 is determined by measuring power transfer to one or more antenna listening devices at one or more data points on one or more axes. The one of more listening devices include NFC antenna coils of unequal sizes that receive NFC signals from the NFC/FELICA antenna feed 204. In this disclosure, three listening devices are used to measure the performance of the NFC/FELICA antenna feed 204, which are referred to as Listener 1, Listener 3, and Listener 6. For example, Table 1 illustrates exemplary minimum voltage potentials at Listener 1, Listener 3, and Listener 6 that may indicate acceptable performance of the NFC/FELICA antenna feed 204.

TABLE 1

|  | Coil | Acceptable Voltage |
|---|---|---|
| Voltage | Listener 1 | 4.10 |
|  | Listener 3 | 3.14 |
|  | Listener 6 | 3.79 |

In addition, in certain embodiments, the voltage potentials are measured at one or more points on orthogonal X, Y, and Z axes that cross at a center point on the listening devices, which has coordinates (0, 0, 0). The X-axis measures a horizontal distance in millimeters (mm), the Y-axis measures a vertical distance in millimeters, and the Z-axis measures a distance above or below the listening devices in millimeters.

Table 2 illustrates exemplary NFC/FELICA antenna feed 204 power transfer results of voltage potentials at Listener 1 at a top left corner and top right corner of the coil. In some implementations, the top left corner of the Listener 1 coil has (X, Y) coordinates of (21 mm, 106 mm), and the top right corner of the Listener 1 coil has (X, Y) coordinates of (−22 mm, 103 mm). In addition, the Listener 1 voltage potentials are measured at 0 mm and 5 mm from the Listener 1 coil. For each test point illustrated in Table 2, the measured voltages are greater than the acceptable minimum of 4.10 V.

TABLE 2

| Listener 1 | Top Left (21, 106) | Top Right (−22, 103) |
|---|---|---|
| 0 mm | 5.4 V | 4.95 V |
| 5 mm | 4.74 V | 4.73 V |

Table 3 illustrates exemplary NFC/FELICA antenna feed 204 power transfer results of voltage potentials at Listener 3 at a top left corner, top right corner, bottom left corner, and bottom right corner of the coil. In some implementations, the top left corner of the Listener 3 coil has (X, Y) coordinates of (19 mm, 115 mm), the top right corner of the Listener 3 coil has (X, Y) coordinates of (−20 mm, 112 mm), the bottom left corner of the Listener 3 coil has (X, Y) coordinates of (21 mm, 113 mm), and the bottom right corner of the Listener 3 coil has (X, Y) coordinates of (−21 mm, 1123 mm). In addition, the Listener 3 voltage potentials are measured at 0 mm and 5 mm from the Listener 3 coil. For each test point illustrated in Table 3, the measured voltages are greater than the acceptable minimum of 3.14 V.

TABLE 3

| Listener 3 | Top Left (19, 115) | Top Right (−20, 112) | Bottom Left (21, 113) | Bottom Right (−21, 113) |
|---|---|---|---|---|
| 0 mm | 5.02 V | 4.84 V | 4.92 | 4.9 |
| 5 mm | 4.39 V | 4.06 V | 4.25 | 4.28 |

Table 4 illustrates exemplary NFC/FELICA antenna feed 204 power transfer results of voltage potentials at Listener 6 at a top left corner, top right corner, and bottom left corner corner of the coil. In some implementations, the top left corner of the Listener 6 coil has (X, Y) coordinates of (9.5 mm, 120 mm), the top right corner of the Listener 6 coil has (X, Y) coordinates of (−14 mm, 120 mm), and the bottom left corner of the Listener 3 coil has (X, Y) coordinates of (18 mm, 125 mm). In addition, the Listener 6 voltage potentials are measured at 0 mm and 5 mm from the Listener 6 coil. For each test point illustrated in Table 4, the measured voltages are greater than the acceptable minimum of 3.79 V.

TABLE 4

| Listener 6 | Top Left (9.5, 120) | Top Right (−14, 120) | Bottom Left (18, 125) |
|---|---|---|---|
| 0 mm | 4.9 V | 3.87 V | 4.53 V |
| 5 mm | 4.44 V | 3.81 V | 3.91 V |

Figure 11A:
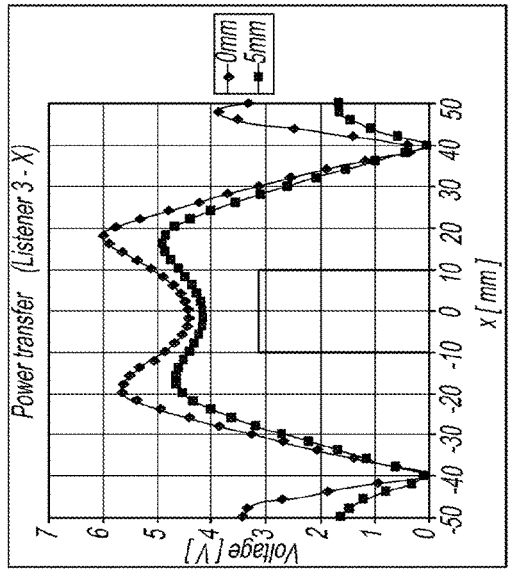
FIGS. 11A-11D illustrate exemplary performance results of the NFC/FELICA antenna feed, according to certain embodiments.
Figure 11B:
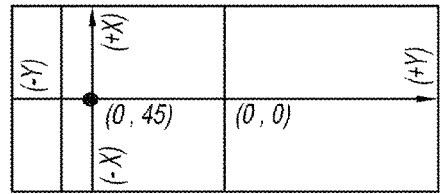
Figure 11C:
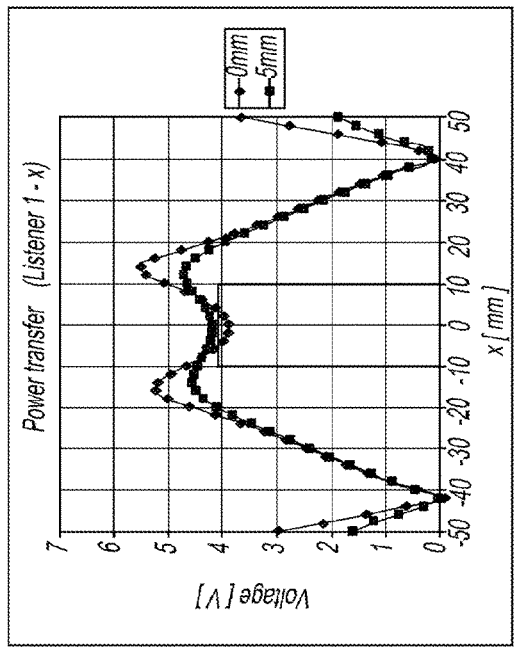
Figure 11D:
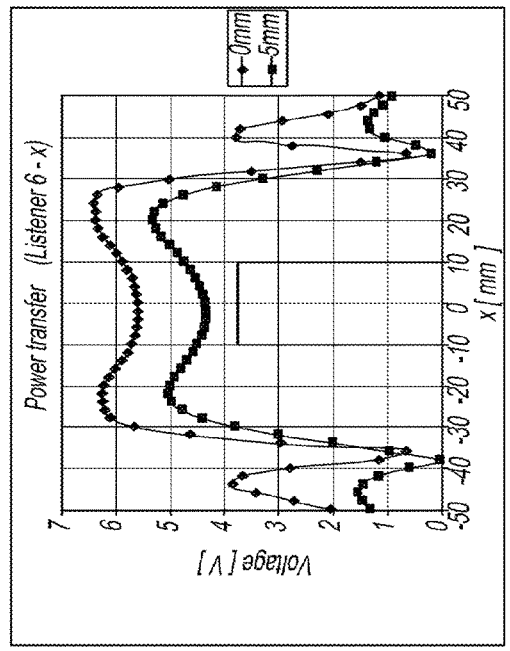

FIGS. 11A-11D illustrate exemplary performance results of the NFC/FELICA antenna feed 204 across the X-axis of Listener 1, Listener 3, and Listener 6, according to certain embodiments. The results in the graphs for FIGS. 11A-11D illustrate power transfer to the listening devices where the coils of Listener 1, Listener 3, and Listener 6 are centered at the (X, Y) coordinate of (0 mm, 45 mm). FIG. 11A illustrates power transfer to Listener 1, FIG. 11B illustrates power transfer to Listener 3, and FIG. 11C illustrates power transfer to Listener 6. FIG. 11D is an exemplary illustration of coordinate axes for an exemplary listening device, according to certain embodiments.

Figure 12A:
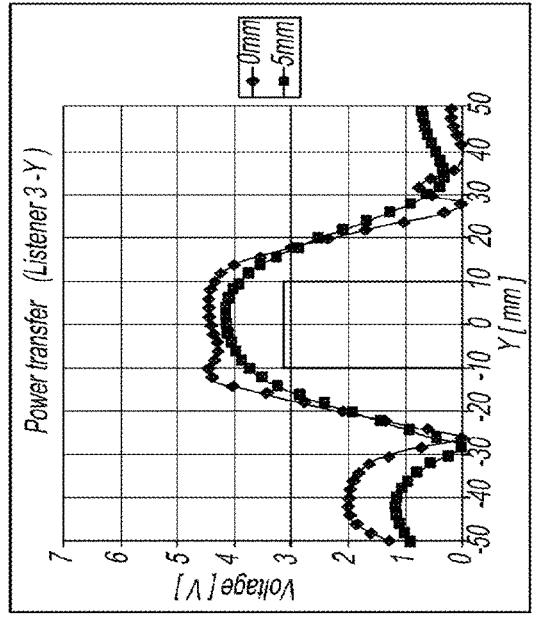
FIGS. 12A-12D illustrate exemplary performance results of the NFC/FELICA antenna feed, according to certain embodiments.
Figure 12B:
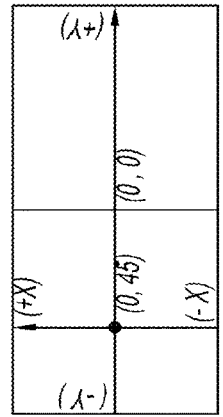
Figure 12C:
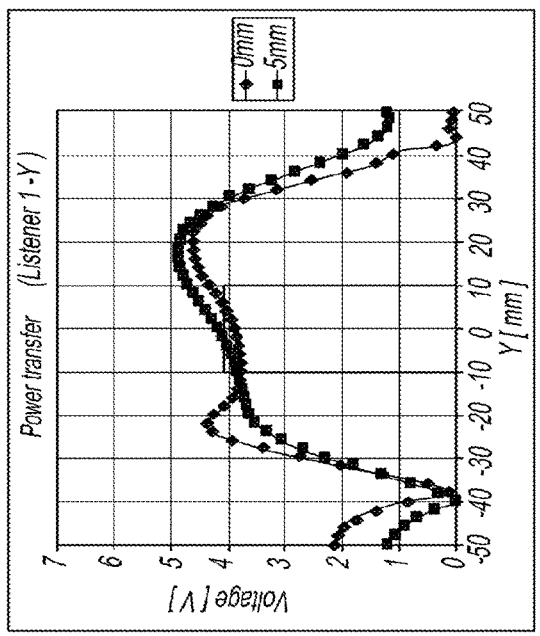
Figure 12D:
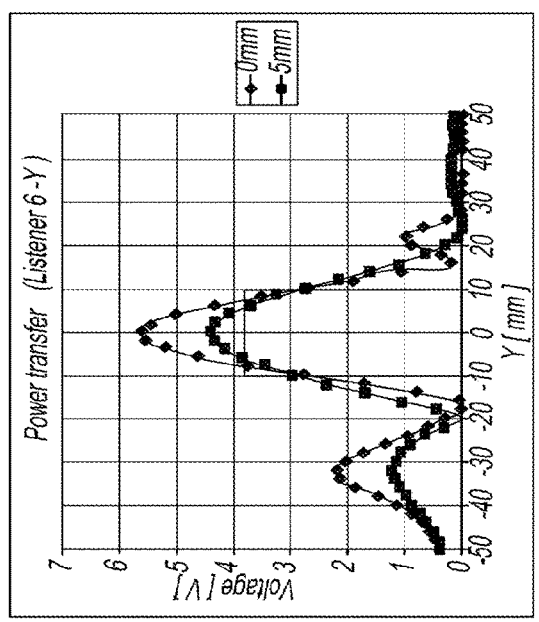

FIGS. 12A-12D illustrate additional exemplary performance results of the NFC/FELICA antenna feed 204 across the Y-axis of Listener 1, Listener 3, and Listener 6, according to certain embodiments. The results in the graphs for FIGS. 12A-12D illustrate power transfer to the listening devices where the coils of Listener 1, Listener 3, and Listener 6 are centered at the (X, Y) coordinate of (0 mm, 45 mm). FIG. 12A illustrates power transfer to Listener 1, FIG. 12B illustrates power transfer to Listener 3, and FIG. 12C illustrates power transfer to Listener 6. FIG. 12D is an exemplary illustration of coordinate axes for an exemplary listening device, according to certain embodiments.

Figure 13A:
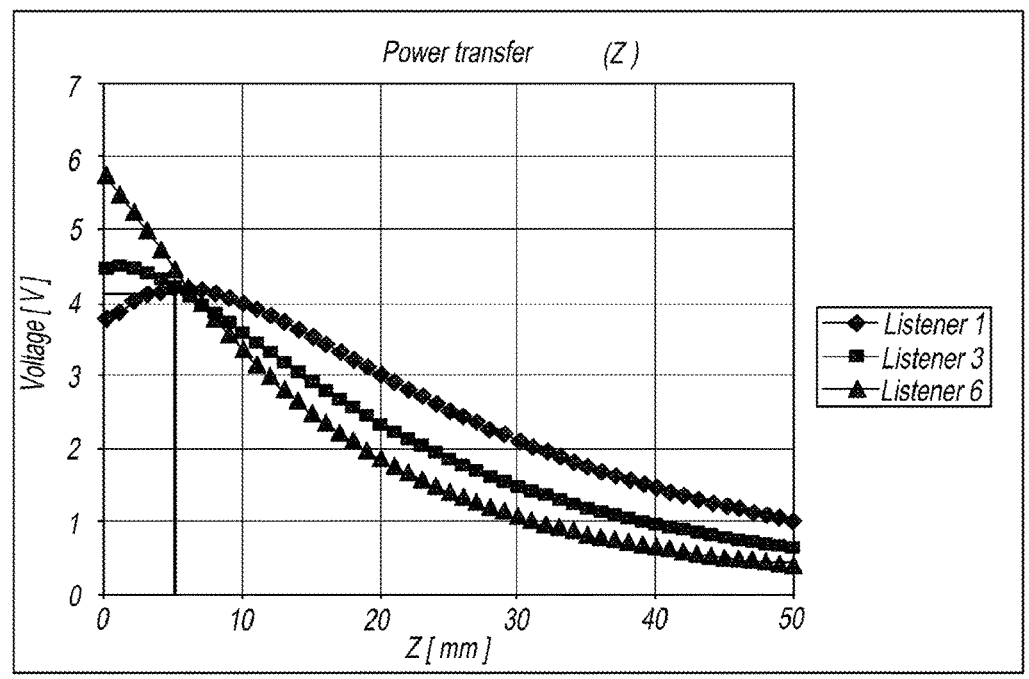
FIGS. 13A-13B illustrate exemplary performance results of the NFC/FELICA antenna feed, according to certain embodiments.
Figure 13B:
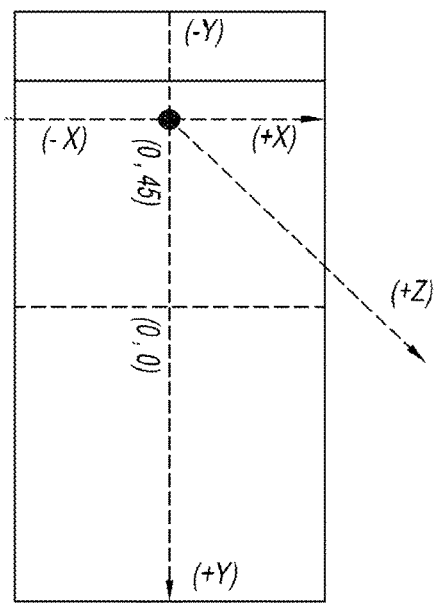

FIGS. 13A and 13B illustrate additional exemplary performance results of the NFC/FELICA antenna feed 204 along the Z-axis of Listener 1, Listener 3, and Listener 6, according to certain embodiments. The results in the graph in FIG. 13A illustrate power transfer to the listening devices where the coils of Listener 1, Listener 3, and Listener 6 are centered at the (X, Y) coordinate of (0 mm, 45 mm). FIG. 13B is an exemplary illustration of coordinate axes for an exemplary listening device, according to certain embodiments.

Figure 15:
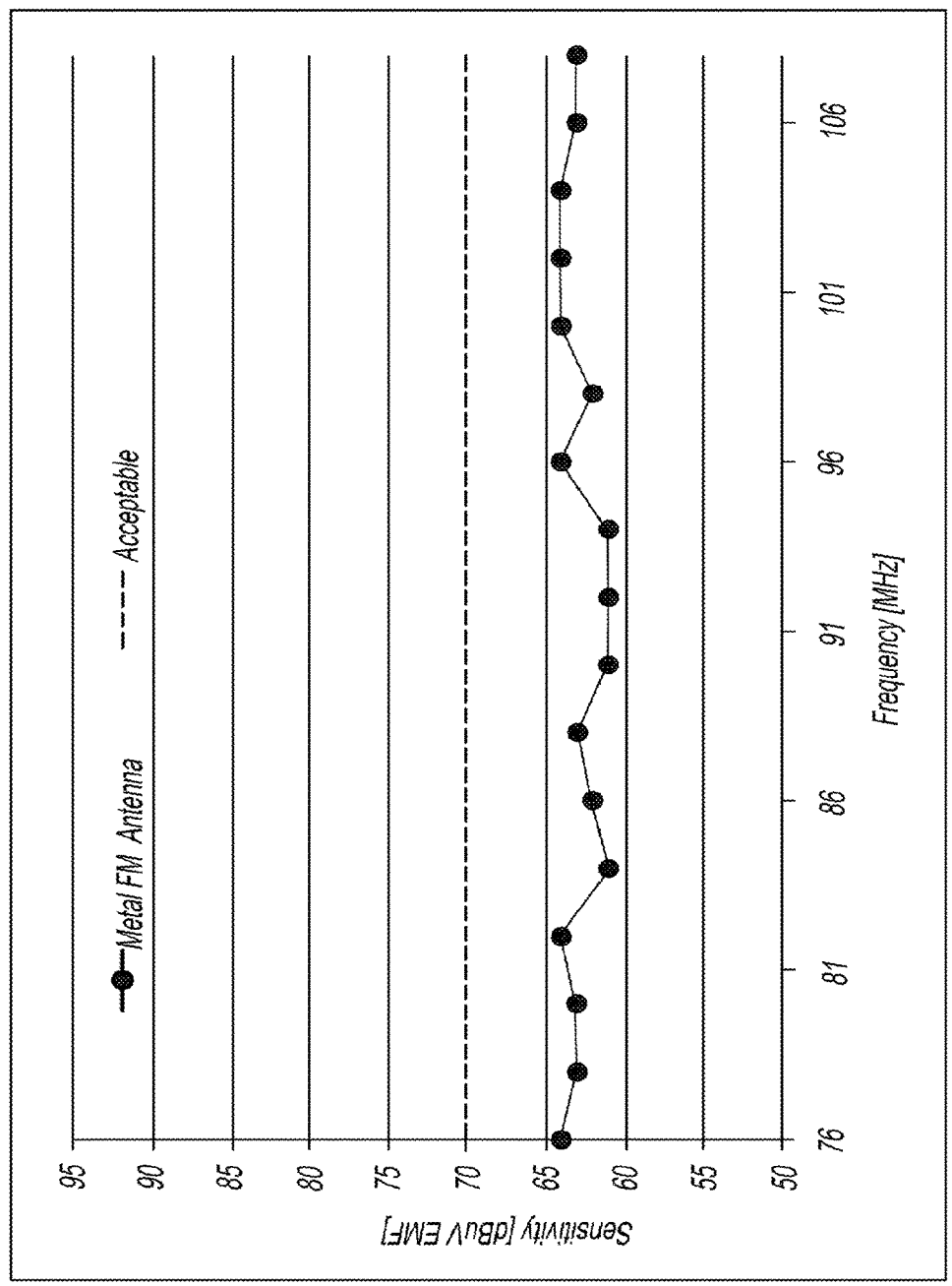
FIG. 15 is an exemplary graph of antenna sensitivity for the FM radio antenna feed, according to certain embodiments.

FIGS. 14A-14C illustrate exemplary load modulation measurements for the NFC/FELICA antenna feed 204, according to certain embodiments. FIG. 14A is an illustration of a plurality of load modulation test points on an X-Y-Z axis of the combination antenna 100. FIG. 14B is an exemplary graph of load modulation results for the NFC/FELICA antenna feed 204 at X-Y points (−15 mm, 45 mm), (0 mm, 45 mm), and (+15 mm, 45 mm) for each of the load modulation test points illustrated in FIG. 20A. FIG. 20C is an exemplary graph that shows exemplary load modulation values for four of the load modulation test points illustrated in FIG. 14B. As shown in FIGS. 14B and 14C, the load modulation values for the observed test points are between a minimum spec line and a maximum FIG. 15 is an exemplary graph of antenna sensitivity for the FM radio antenna, according to certain embodiments. The sensitivity of the FM radio antenna in decibels of EMF microvolts (dBμV EMF) is shown with respect to frequency. In some implementations, a maximum acceptable sensitivity for the FM radio antenna feed 404 is approximately 70 dBμV EMF. As shown in FIG. 15, the sensitivity level for the FM radio antenna is less than the maximum acceptable sensitivity for observed frequencies from 76 Megahertz (MHz) to greater than 106 MHz.

Figure 16:
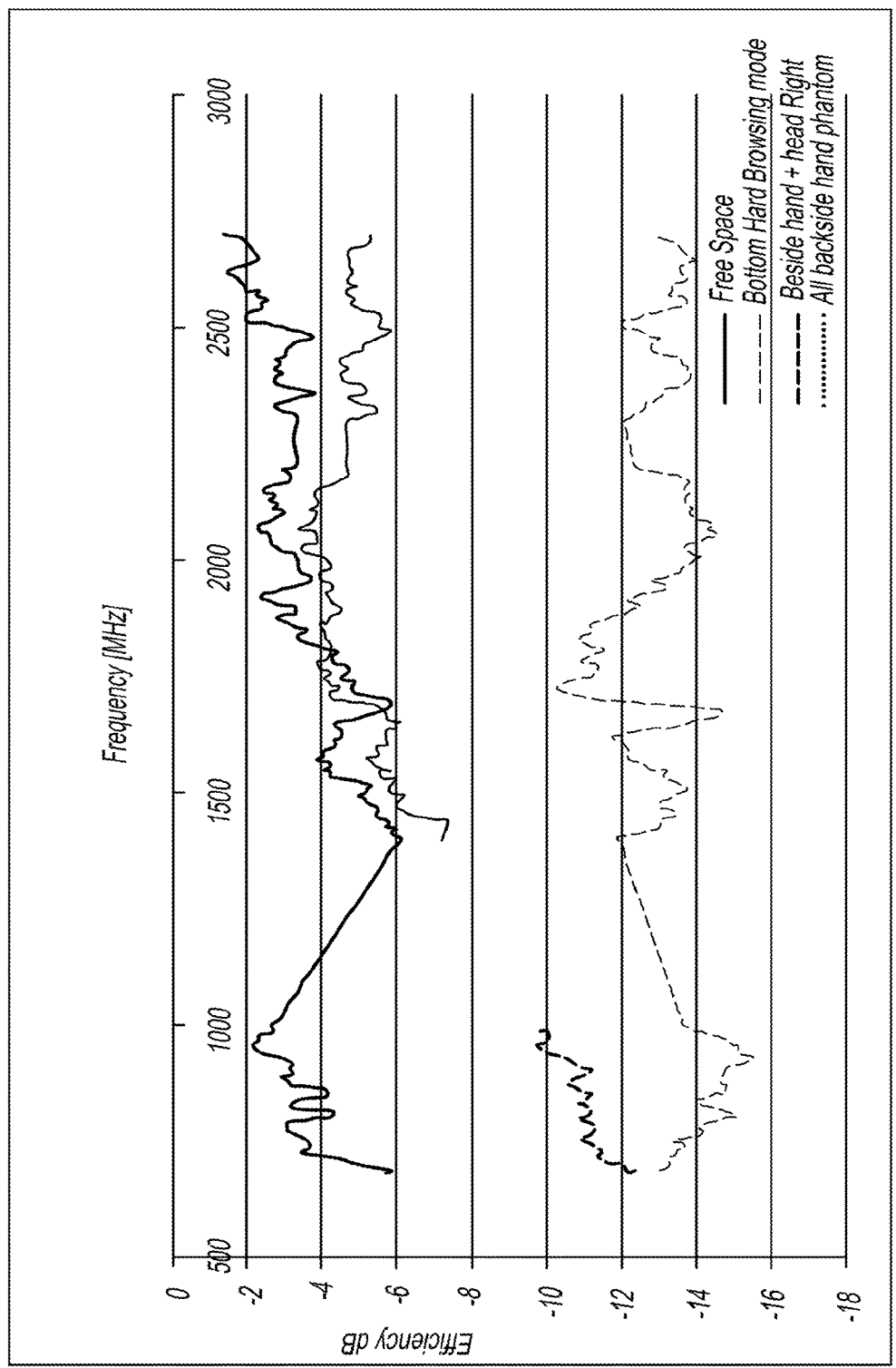
FIG. 16 is a graph of antenna efficiency for an exemplary main cellular antenna feed of a combination antenna, according to certain embodiments.

FIG. 16 is an exemplary graph of antenna efficiency for an exemplary cellular antenna of a combination antenna 100, according to certain embodiments. The efficiency of the cellular antenna feed in decibels (dB) is measured for frequencies ranging from 500 MHz to 3000 MHz. The graph in FIG. 16 illustrates for different instances for the efficiency for the cellular antenna feed. Examples include the efficiency for the cellular antenna feed in free space, when a hand of a user is covering a bottom half of the electronic device when in browsing mode, when the electronic device is being held up to the right ear of the user, and when the entire back side of the electronic device is covered by one or more lossy materials.

Obviously, numerous modifications and variations of the present disclosure are possible in light of the above teachings. It is therefore to be understood that within the scope of the appended claims, the invention may be practiced otherwise than as specifically described herein.

The above disclosure also encompasses the embodiments listed below.

(1) A combination antenna including: a conductive block having at least one surface-mount electrical component mounted thereon; a metallic housing connected to the conductive block via at least one electronic element having a front surface and a rear surface wherein the front surface includes one or more plates separated by one or more gaps of a predetermined width, and the rear surface includes a continuous plate separated from the front surface by a gap of a second predetermined width; one or more antenna feeds disposed between the front surface and the rear surface of the metallic housing, wherein the one or more antenna feeds are connected to the metallic housing directly or via the at least one electronic element; and a ground plane with one or more grounding points connected to the front surface and the rear surface directly or via the at least one electronic element.

(2) The combination antenna of (1), wherein the one or more plates of the front surface of the metallic housing include at least one side plate and at least one of a top plate and a bottom plate.

(3) The combination antenna of (1) or (2), wherein the one or more plates of the front surface are connected via the at least one electronic element.

(4) The combination antenna of any one of (1) to (3), further including a near field communication antenna feed connected between the top plate or the bottom plate and one of the side plates via the at least one electronic element.

(5) The combination antenna of any one of (1) to (4), wherein the top plate, the at least one side plate, and the bottom plate or rear form a loop structure via one or more filter connections to function as a near field antenna.

(6) The combination antenna of any one of (1) to (5), wherein the near field antenna feed produces beams having wide operating volumes via the metallic housing.

(7) The combination antenna of any one of (1) to (6), further including a wireless charging antenna feed connected in parallel with the near field communication antenna feed between the top plate or the bottom plate and one of the side plates via at least one of a switch, matching circuit, and multiplexer.

(8) The combination antenna of any one of (1) to (7), further including a FM radio antenna feed connected to the metallic housing directly or via the at least one electronic element.

(9) The combination antenna of any one of (1) to (8), wherein the one or more antenna feeds share at least one common feed location.

(10) The combination antenna of any one of (1) to (9), wherein the at least one electronic element includes at least one of inductors, capacitors, diplexers, filter circuitry, matching circuitry, and switching circuitry.

(11) The combination antenna of any one of (1) to (10), wherein the one or more antenna feeds are connected to at least one of the top plate and bottom plate of the front surface of the metallic housing.

(12) The combination antenna of any one of (1) to (11), wherein the top plate is disconnected electrically from the at least one side plate and functions as at least one of a cellular antenna and a GPS antenna.

(13) The combination antenna of any one of (1) to (12), wherein the one or more grounding points are connected to the front surface of the metallic housing via one or more high bandpass filters to provide antenna tuning.

(14) The combination antenna of any one of (1) to (13), wherein the front surface of the metallic housing is disposed around a periphery of the conductive block.

(15) The combination antenna of any one of (1) to (14), wherein the metallic housing has a rectangular shape, a rounded shape, or one or more tapered corners.

(16) The combination antenna of any one of (1) to (15), wherein the rear surface of the metallic housing is connected to the ground plane for cellular antenna bands, and disconnected electrically from the ground plane for near field communication, wireless charging, and FM antenna bands.

(17) The combination antenna of any one of (1) to (16), wherein the rear surface of the metallic housing operates in two modes including a first mode wherein the rear surface performs near field communication, wireless charging, and FM communication with the front surface of the metallic housing, and a second mode wherein the rear surface of the metallic housing functions as the ground plane for at least one cellular, WIFI, and GPS antenna.

(18) The combination antenna of any one of (1) to (17), wherein at least one of the one or more antenna feeds are connected to at least one separate antenna element via the at least one electronic element.

(19) The combination antenna of any one of (1) to (18), wherein the at least one separate antenna element is disposed between the front surface and the rear surface of the metallic housing.

(20) A combination antenna including: a housing having a front surface and a rear surface wherein the front surface includes a non-conductive frame having one or more conductive traces mounted thereon, and the rear surface includes a continuous plate separated from the front surface by a gap of a second predetermined width; one or more antenna feeds disposed between the front surface and the rear surface of the metallic housing, wherein the one or more antenna feeds are connected to the metallic housing directly or via the at least one electronic element; and a ground plane with one or more grounding points connected to the front surface and the rear surface directly or via the at least one electronic element.

The invention claimed is:
1. An antenna comprising:
a conductive block having at least one surface-mount electrical component mounted thereon;
a metallic housing connected to the conductive block via at least one electronic element having a front surface and a rear surface wherein
the front surface includes a plurality of plates each separated by gaps of predetermined widths, and
the rear surface includes a plate that is larger than each of the plurality of plates and is separated from the front surface by a gap of a second predetermined width;
one or more antenna feeds disposed between the front surface and the rear surface of the metallic housing, wherein
the one or more antenna feeds are connected to the metallic housing directly or via the at least one electronic element; and
a ground plane with one or more grounding points connected to the front surface and the rear surface directly or via the at least one electronic element.

2. The antenna of claim 1, wherein
the plurality of plates of the front surface of the metallic housing include at least one side plate and at least one of a top plate and a bottom plate.

3. The antenna of claim 2, wherein
the plurality of plates of the front surface are connected via the at least one electronic element.

4. The antenna of claim 2, further comprising:
a near field communication antenna feed connected between the top plate or the bottom plate and one of the at least one side plate via the at least one electronic element.

5. The antenna of claim 4, wherein
the top plate, the at least one side plate, and the bottom plate or rear surface form a loop structure via one or more filter connections to function as a near field antenna.

6. The antenna of claim 5, wherein
the near field antenna feed produces beams having wide operating volumes via the metallic housing.

7. The antenna of claim 4, further comprising:
a wireless charging antenna feed connected in parallel with the near field communication antenna feed between the top plate or the bottom plate and one of the at least one side plate via at least one of a switch, matching circuit, and multiplexer.

8. The antenna of claim 1, further comprising:
a FM radio antenna feed connected to the metallic housing directly or via the at least one electronic element.

9. The antenna of claim 1, wherein
the one or more antenna feeds share at least one common feed location.

10. The antenna of claim 1, wherein.
the at least one electronic element includes at least one of inductors, capacitors, diplexers filter circuitry, matching circuitry, and switching circuitry.

11. The antenna of claim 2, wherein
the one or more antenna feeds are connected to at least one of the top plate and bottom plate of the front surface of the metallic housing.

12. The antenna of claim 2, wherein
the top plate is disconnected electrically from the at least one side plate and functions as at least one of a cellular antenna and a GPS antenna.

13. The antenna of claim 1, wherein
the one or more grounding points are connected to the front surface of the metallic housing via one or more high bandpass filters to provide antenna tuning.

14. The antenna of claim 1, wherein
the front surface of the metallic housing is disposed around a periphery of the conductive block.

15. The antenna of claim 1, wherein
the metallic housing has a rectangular shape, a rounded shape, or one or more tapered corners.

16. The antenna of claim 1, wherein
the rear surface of the metallic housing is connected to the ground plane for cellular antenna bands, and disconnected electrically from the ground plane for near field communication, wireless charging, and FM antenna bands.

17. The antenna of claim 1, wherein the rear surface of the metallic housing operates in two modes including:
    a first mode wherein the rear surface performs near field communication, wireless charging, and FM communication with the front surface of the metallic housing, and
    a second mode wherein the rear surface of the metallic housing functions as the ground plane for at least one cellular, WIFI and GPS antenna.

18. The antenna of claim 1, wherein
at least one of the one or more antenna feeds are connected to at least one separate antenna element via the at least one electronic element.

19. The antenna of claim 18, wherein
the at least one separate antenna element is disposed between the front surface and the rear surface of the metallic housing.

20. An antenna comprising:
    a housing having a front surface and a rear surface wherein
    the front surface includes a non-conductive frame having a plurality of conductive traces mounted thereon, each of the conductive traces being separated by gaps of predetermined widths, and
    the rear surface includes a plate that is larger than each of the plurality of conductive traces and is separated from the front surface by a gap of a second predetermined width;
    one or more antenna feeds disposed between the front surface and the rear surface of the metallic housing, wherein
    the one or more antenna feeds are connected to the metallic housing directly or via at least one electronic element; and
    a ground plane with one or more grounding points connected to the front surface and the rear surface directly or via the at least one electronic element.

* * * * *